(12) United States Patent
Maricic

(10) Patent No.: US 11,727,224 B1
(45) Date of Patent: Aug. 15, 2023

(54) DETERMINING RFID-TAG LOCATIONS IN A FACILITY

(71) Applicant: Amazon Technologies, Inc., Seattle, WA (US)

(72) Inventor: Danijel Maricic, Bedford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/822,636

(22) Filed: Mar. 18, 2020

(51) Int. Cl.
G06F 17/00 (2019.01)
G06K 7/10 (2006.01)
H04B 5/00 (2006.01)
G06Q 30/06 (2023.01)
G07G 1/00 (2006.01)

(52) U.S. Cl.
CPC ......... *G06K 7/10099* (2013.01); *G06Q 30/06* (2013.01); *G07G 1/0009* (2013.01); *H04B 5/0062* (2013.01)

(58) Field of Classification Search
CPC ....... G06Q 10/087; G16H 10/60; G16H 40/20
USPC .............................. 235/375, 462.46, 472.02
See application file for complete search history.

(56) References Cited

U.S. PATENT DOCUMENTS

| | | | | |
|---|---|---|---|---|
| 7,504,949 | B1 * | 3/2009 | Rouaix | G06Q 10/06 340/572.1 |
| 7,762,458 | B2 * | 7/2010 | Stawar | G06Q 20/20 235/383 |
| 9,235,928 | B2 | 1/2016 | Medioni et al. | |
| 9,473,747 | B2 | 10/2016 | Kobres et al. | |
| 9,534,906 | B2 * | 1/2017 | High | G06V 10/242 |
| 9,656,805 | B1 * | 5/2017 | Evans | G05B 19/4182 |
| 10,346,794 | B2 * | 7/2019 | High | G06F 16/5854 |
| 10,417,878 | B2 * | 9/2019 | Herring | G01B 11/00 |
| 10,422,852 | B1 * | 9/2019 | Thiagarajan | G01S 5/0257 |
| 2008/0068170 | A1 * | 3/2008 | Ehrman | G06Q 10/08 340/572.1 |
| 2008/0272914 | A1 * | 11/2008 | Murray | G06Q 20/203 340/572.1 |
| 2009/0231135 | A1 * | 9/2009 | Chaves | G06Q 10/087 340/572.1 |
| 2013/0284806 | A1 | 10/2013 | Margalit | |
| 2015/0206121 | A1 * | 7/2015 | Joseph | B62B 3/1496 705/23 |
| 2016/0078264 | A1 * | 3/2016 | Armstrong | G06K 7/10475 340/572.1 |
| 2018/0307877 | A1 * | 10/2018 | Sundaresan | G06K 7/10366 |

(Continued)

*Primary Examiner* — Daniel St Cyr
(74) *Attorney, Agent, or Firm* — Lee & Hayes, P.C.

(57) ABSTRACT

This disclosure is directed to techniques for determining respective locations of radio-frequency identification (RFID) tags distributed within a materials handling facility using planogram data that indicates respective item locations of items in the facility. In some examples, the techniques utilize item-identifying carts that automatically identify items that the users place in their carts as they move around a facility. Upon identifying an item, the identity of the item may be provided from the cart to one or more servers, along with an indication of an RFID tag detected by an RFID reader mounted to the cart. Upon receiving the identity of the item and the indication of the RFID tag, the servers may access the planogram data for the facility to determine an item location of the item within the facility and may associate this item location as the location of the RFID tag.

18 Claims, 14 Drawing Sheets

(56) References Cited

U.S. PATENT DOCUMENTS

2019/0236583 A1* 8/2019 Hagen ................ G06Q 30/0635
2021/0065528 A1* 3/2021 Bergman ........... G08B 13/2417

* cited by examiner

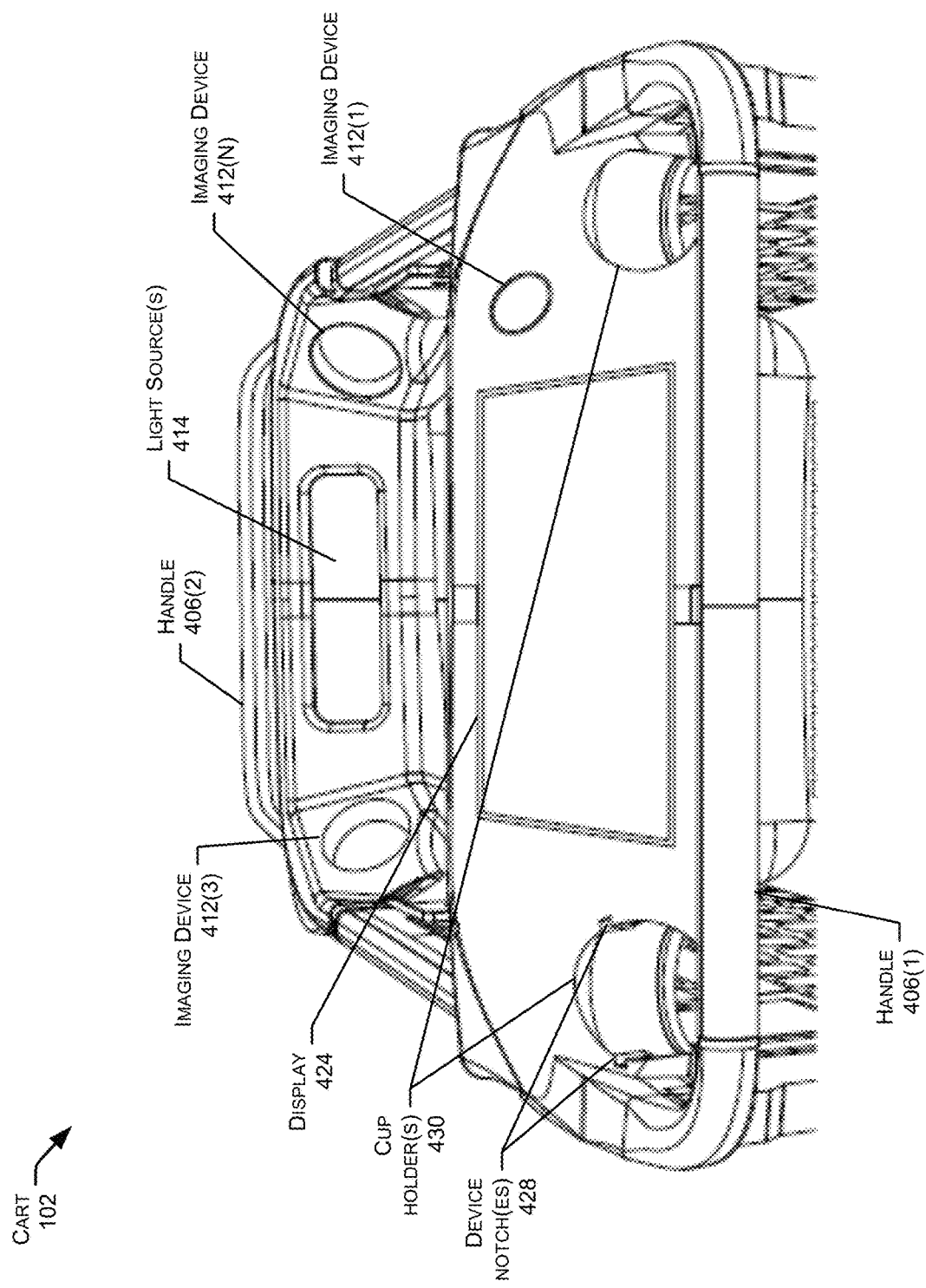

DETERMINING RFID-TAG LOCATIONS IN A FACILITY

BACKGROUND

Materials handling facilities, such as warehouses or retail stores, often provide users with carts to facilitate the processes by which the users locate, identify, retrieve, and transport items at the facilities. For example, when a user identifies an item that he or she desires on a rack or other location within a materials handling facility, the user may remove the item from the rack or other location and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from racks or other locations within a materials handling facility, and placing the items into bags or other carriers for transportation to their desired destination (e.g., automobile or home), may be a two-step process. First, the items must be retrieved from the racks or other storage locations and placed into the cart, and second, the items must be removed from the cart, scanned, and placed into a bag or other item carrier. These intervening actions that are required to transition items from a rack or other storage location into the bags or other item carrier necessarily slows the process by which items are retrieved from a materials handling facility and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4B illustrates a front view of the example item-identifying cart of FIG. 4A. As illustrated, the cart may include a display, which may be used to provide feedback to a user operating the cart.

DETAILED DESCRIPTION

Figure 1:
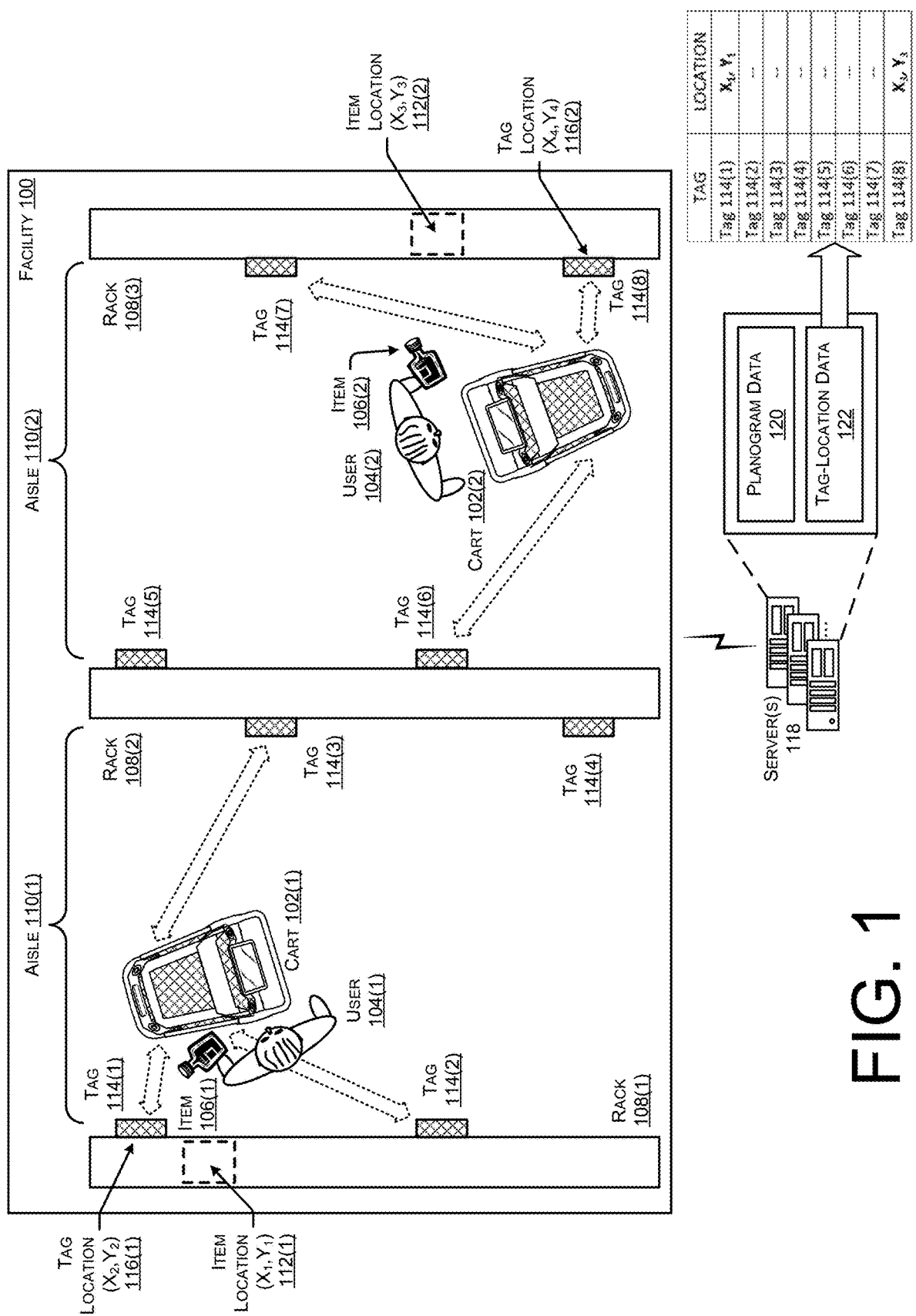
FIG. 1 illustrates users operating respective mobile carts within a facility that is associated with a planogram that indicates respective item locations of different items offered for acquisition in the facility and that includes multiple radio-frequency identification (RFID) tags affixed to different surfaces of the facility. In some instances, a system (e.g., the cart, the illustrated, servers, etc.) may learn, using the planogram data and item-identification data generated by the carts, respective locations of the RFID tags as the users acquire items in the facility.

This disclosure is directed to techniques for determining respective locations of radio-frequency identification (RFID) tags distributed within a materials handling facility using planogram data that indicates respective item locations of items in the facility. In some examples, the techniques utilize item-identifying carts that automatically identify items that the users place in their carts as they move around a facility. Upon identifying an item, the identity of the item may be provided from the cart to one or more servers, which may reside at the facility and/or remote from the facility. Upon receiving the identity of the item, the servers may access the planogram data for the facility to determine an item location of the item within the facility. This location information may be specified as X, Y coordinates, X, Y, Z coordinates, or in any other manner.

In addition to identifying the item, the cart may include one or more RFID readers mounted to a frame of the cart for reading respective RFID tags as the user moves the cart through the facility. In some instances, the cart includes a first RFID reader on a right side for reading tags affixed to surfaces of the facility to the right of the cart and a second RFID reader on a left side of the cart for reading tags affixed to surfaces of the facility to the left of the cart. For example, these readers may reside on a bottom portion of the cart, near the floor on which the cart is moved, while the RFID tags may be located in a similar horizontal plane, such as several inches from the floor of the facility and on respective inventory racks within the facility.

In some instances, the RFID reader(s) on the cart store indications of the RFID tags identified over time and the respective signal strength of these tags over time. For example, upon identifying a first RFID tag with a first signal strength at a first time, the RFID reader(s) may store an indication of this first tag and the first signal strength in association with the first time. As the signal strength changes over time (eventually becoming zero when the reader no longer detects the tag), the RFID reader(s) may store these respective signal strengths at their respective times. Further, when the RFID reader(s) identify a second tag, the RFID reader(s) may store an indication of this second tag along with the respective signal strength as this signal strength changes over time.

Upon identifying an item, the cart (or the servers) may determine which RFID tag is likely nearest to the item location of the item based on the stored signal strengths. For example, upon identifying a particular item at a first time, the cart may determine a time range around this first time, with the time range beginning prior to the first time and ending after the first time. For example, the cart may define a ten-second time range equally distributed about the first time at which the item was identified. Thereafter, the cart (or the servers) may determine which RFID tag was associated with a highest signal strength during this time range.

In one example, the cart determines which RFID tag is associated with the highest signal strength during the time range and provides an indication of this tag to the servers. In response to receiving this indication, the servers may associate the item location (determined from the planogram data) with a location of the RFID tag having the highest signal strength. This process may repeat as users continue to place items into and remove items from their item-identifying carts that include the RFID reader(s). Thus, over time, the carts and/or servers may use these techniques to generate a map indicating respective locations of RFID tags within the facility. This map, in turn, may be later used for localizing the carts within the facility.

It is to be appreciated that while the above example, and some examples discussed below, describe the servers as receiving the item-identification information and the tag-identification data from the carts, it is to be appreciated that in other instances the carts may perform some or all the techniques locally. That is, the carts may associate the item locations with respective locations of the identified RFID tags, may maintain the map of the RFID-tag locations, and/or the like. Conversely, while the above example describes the carts defining the time range around a time at which an item is identified, in some instances the carts provide the RFID-tag-identification information and the signal-strength information to the servers, which may determine which tag has the highest signal strength and, thus, should be associated with location associated with the identified item. Stated otherwise, the techniques described herein may be performed by the carts, by one or more servers, and/or by a combination thereof.

In addition, while the above example, and examples described below, describe determining the identity of an item using an item-identifying cart, the techniques may identify the items in other ways. For example, the facility may include one or more overhead camera, in-rack cameras, and/or the like, which may generate image data of the items has the users remove the items from the racks and one place the items back onto the racks. This image data may be analyzed using computer-vision (CV) techniques for identifying the respective items. Upon identifying an item, the servers (or cart) may access the planogram data for determining an item location of the item, which may then be associated with the RFID tag having a highest signal strength during a defined time range around the time at which the user picked or returned the item. Of course, while a few examples are described, it is to be appreciated that the techniques may identify the items in any other manner.

Further, while the above example describes determining a location of an RFID tag using the planogram data, it is to be appreciated that one or more additional types of data may be used. For example, envision that an RFID reader of a cart determines that a first tag is associate with a highest signal strength proximate to a time at which a user places an item into a basket of her cart. Envision also that the RFID reader identifies (within the time range) a second RFID tag that is associated with a known location. That is, the second RFID tag may have previously been associated with a location using the techniques described herein. In this example, this known location of the second RFID tag may be used along with the planogram data for associating a location with the first RFID tag. For example, the techniques may use the item location from the planogram and the known location of the second RFID tag to triangulate or otherwise calculate a location of the first RFID tag.

In another example, the carts may include one or more additional sensors that may generate data for use in determining a location of an RFID tag. For example, a cart may include an accelerometer or the like that generates accelerometer or other motion data, indicative of movement of the cart. The cart (or servers) may use this accelerometer data in addition to the planogram data for associating a location with the RFID tag. For example, the techniques may determine, using the accelerometer data, that the cart is moving away from the item location (associated with the identified item) in a certain direction. Thus, rather than assign the item location as the location of the tag, the techniques may alter this location in the direction of movement of the cart. Of course, while this example describes using an onboard sensor, such as an accelerometer, for determining movement of the cart, it is to be appreciated that this may be determined using overhead cameras in the facility or in other ways.

As noted above, the techniques described herein may associate an item location from a planogram as the location of an identified RFID tag. In other instances, meanwhile, the techniques may determine a location of the identified RFID tag using a trained model, rather than directly associating the item location as the tag location. For example, the techniques may train a model using a first set of training data corresponding to known item locations (i.e., the planogram data) and a second set of training data corresponding to known tag locations. Thereafter, a cart may move through a facility associated with the known item and tag locations, measuring the respective RFID signal strengths. Thus, the model may be trained to learn how the different signal strengths corresponding to the locations of the item and the locations of the tags. This model may thereafter be used to determine a location of a tag in a facility for which the item locations are known, but the tag locations are not. For example, the planogram data and the RFID signal strength data may be input to the trained model, which may output information for associating a location of one or more RFID tags.

As the reader will appreciate, the techniques described herein may function to build, over time, a map of RFID tag locations within a facility. After creation of this map, the carts (and/or other objects having RFID reader(s) mounted thereto) may be localized within the facility. That is, the signal strengths measured by the RFID reader(s) may be used to triangulate or otherwise determine a location of the cart or other object within a facility. This cart-localization data may be used for a variety of purposes. For example, this information may be used to determine when a particular cart is within a particular zone, such as an exit zone. Upon determining that a cart has entered an exit zone, the techniques may finalize a transaction with a user that is operating the cart. For example, the techniques may determine a payment instrument associated with the user, charge the payment instrument for items acquired by the user, and provide a receipt to the user. In another example, if a cart is determined to have entered an age-restricted zone, such as an alcohol aisle at a grocery store, the techniques may generate an indication that a user of the cart may need to verify her age prior to finalization of her transaction. In another example, the cart may include a display, which may present location-specific information as the user navigates the facility, such as information regarding items that the user is near, promotion data, and/or the like. In still other examples, the cart-localization data may be used to generate a heat map indicating traffic patterns of carts within the facility, for locating a user that has requested assistance, and/or for an array or other purposes.

In still other instances, the map of RFID tags may be used to help determine which items a user has placed into or removed from their cart. For example, when a user places an item into their cart, the cart or another system may analyze the signal strength of RFID tags around the cart to determine the location of the cart. Once the cart has been localized, the location may be used, in whole or in part, to identify the item placed into the cart. For example, if the cart is determined to be located at a particular portion of a particular aisle of a facility, the items that are associated (e.g., within a planogram) with respective locations that are near the location of the cart may be deemed candidate items for the item placed into the cart.

In some instances, the techniques described herein are performed using item-identifying carts (or "smart carts") that both identify items placed into or removed from the cart and that automatically determine the outcome of respective events that occur with respect to these identified items. For example, the carts may be configured to identify one or more items that are placed into or removed from the cart, and thereafter determine one or more actions taken with respect to the identified items and a quantity of the items involved. For example, after identifying a first item and a second item either placed into or removed from the cart, the cart may determine that the user added two instances of the first item and removed one instance of the second item. In response to making this determination, the cart may update a virtual cart of a user operating the physical cart to indicate an addition of two instances of the first item and to remove an instance of the second item from the virtual cart.

In some instances, the item-identifying cart may include one or more cameras for generating image data, which the cart may thereafter analyze to identify one or more items represented in the image data. After identifying one or more items, the cart may provide feedback to a user operating the cart to indicate that one or more items have been identified. For example, upon a user placing an item into or removing an item from the cart, the cart may generate image data, identify the item, and cause one or more output devices on the cart (or otherwise) to output an indication that the item has been identified. For example, the cart may cause a lighting element on the cart to turn a predefined color (e.g., green) or to illuminate in a predefined lighting sequence. In addition, or in the alternative, the cart may cause a display located on the cart to present data identifying the item, thus indicating to the user that the cart has successfully identified the item that has been placed into or removed from the cart. In still other instances, the cart may cause one or more other displays or output devices (e.g., a mobile phone of the user) to output one or more indications, which may be audible, visual, and/or the like. In still other instances, the cart may cause one or more speakers (on the cart or otherwise) to output an audible tone or other sound indicating that the item has been identified.

Furthermore, sometime after identifying the item(s) and providing feedback to the user that the item(s) have been identified, the cart may attempt to determine the outcome(s) of event(s) involving the identified item(s). For example, after identifying an item placed into or removed from a basket of the cart, the cart may attempt to determine an action taken with respect to the item, such as whether the item placed into the cart (e.g., a "take") or whether the item was removed from the cart (e.g., a "return"). In addition, the cart may attempt to determine a quantity of the items involved, such as whether one, two, or any other number of instances was placed into the cart or removed from the cart. Furthermore, in some instances, the outcome of a particular event may involve multiple identified items and quantities. For instance, after identifying a first item and a second item, the cart may determine that two instances of the first item were added to the cart, while one instance of the second item was removed from the cart. Of course, while an example is provided, it is to be appreciated that the cart may determine any other number of items and any other quantity with respect to these identified items.

After both identifying one or more items and determine outcomes of events involving these items, the cart may provide feedback to the user operating the cart that the outcome has been determined. For example, the cart may cause the display to be updated to present data indicating the determined actions as part of a virtual cart representing a listing of items acquired by the user during a current shopping session. For instance, the display may present data updating the virtual cart of the user to indicate that two instances of the first item have been added to the cart, while one instance of the second item has been removed. Furthermore, the cart may provide other forms of visual and/or audible feedback to the user indicating that the virtual cart has been updated.

In some instances, the smart cart may determine the action(s) taken with respect to the identified item(s) and may determine the quantities involved based at least in part on weight data generated by one or more weight sensors of the cart. For example, the cart may include one or more weight sensors configured to generate weight data indicating a current weight of the basket of the cart. In some instances, before, during, and/or after one or more items have been identified (e.g., using image data generated by the one or more cameras), the cart may analyze the weight data generated by the weight sensors to determine the action(s) taken with respect to the item(s). In some instances, prior to analyzing the weight data to determine the action(s), the cart may wait until the weight reading of the weight sensors has stabilized in order to ensure an accurate weight measurement. That is, given mechanical properties of the cart, the weight signal may be noisy in some instances. For example, the weight signal may be relatively noisy when the cart is being pushed or pulled around, when an item is being added into/removed from the basket, when the cart is being leaned on or rummaged through, or the like. Thus, the smart cart may use an algorithm that attempts to minimize the effect of these perturbations and that indicates whether the weight is stable; this is, when the smart cart can rely on the weight estimation.

After the weight has stabilized, the cart may determine a change in weight equal to a weight of the basket prior to the identification of the item(s) and the current, stabilized weight. After determining the weight change, the cart may use this weight-change and the identity of the identified item(s) to determine action(s) taken with respect to the item(s) and the quantities involved. For example, the cart may access an item catalog that associates item identifiers with respective weights and may use these "catalog weights" to determine the actions.

For example, envision that the cart has identified two items using the image data generated by the cameras, that the weight-change data indicates that the basket weight has increased by 600 grams, and that the catalog weights of the first and second items are 285 grams and 400 grams, respectively. Based on this information, the cart may determine that the outcome of the event relating to these two identified items is that a user operating the cart placed one instance of the first item and one instance of the second item into the basket of the cart (explaining the 600-gram increase). As such, the cart may update a virtual cart associated with the user and provide feedback to the user, such as on a display of the cart, on a mobile device of the user, or the like.

In another example, envision that the cart identifies two items having catalog weights of 250 grams and 300 grams respectively and that the virtual cart of the user currently indicates that the user has previously taken one instance of the second item. Envision further that the weight-change data indicates that the basket has lightened by 50 grams. Based on this information (i.e., the weights of the identified items, the current contents of the virtual cart, and the weight-change data), the cart may determine that the user has added one instance of the first item to the basket and removed one instance of the second item. Thus, the cart may update the virtual cart to indicate the addition of the first item and the removal of one instance of the second item. In some instances, the cart may update the display to provide this feedback to the user.

In some instances, the smart carts described herein may include one or more cameras for identifying items and one or more cameras to identify the users operating the carts. Upon identifying a user operating a cart and items placed into the cart, the item-identifying cart may update a virtual shopping cart of the user to represent the items that have been placed in, or removed from, the physical cart, using the techniques introduced above and described in detail below. According to the techniques described herein, an item-identifying cart may include one or more first cameras positioned on a frame of the cart and directed substantially toward a position typically occupied by a user pushing the cart to generate first image data for identifying the user. For example, the first image data may represent an identifier associated with an account of the user displayed on a mobile device of the user (e.g., a barcode or the like displayed on a mobile phone), biometric-recognition data representing the user, gesture data representing the user, and/or the like. The cart may include components for associating the first image data with the user, or the cart may send the first image data to one or more remote servers for determining this association.

In addition, the cart may include one or more second cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently checkout of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include one or more cameras (or other imaging sensors), memory that stores software components for identifying users and/or items and for performing other operations for managing virtual shopping carts, at least one processor to execute the software components, one or more weight sensors, and at least one battery to power the components of the cart. The camera(s) may include one or more first cameras positioned on the frame toward a location where a user would typically push the cart. The one or more first cameras may generate first image data, such as image data of a mobile phone of a user representing visual indicia (e.g., a barcode) associated with an account of the user. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account.

In some instances, the smart cart may also include one or more displays, which in some instances may reside adjacent the first camera(s) such that the display is viewable by the user operating the cart. The display may present content that is customized for the user at least partly in response to the cart identifying the user via the first image data. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like.

In some instances, upon the cart identifying an item using image data generated by the one or more cameras, the display may present item-identifying information (e.g., name, picture, etc.) on the display, thus providing feedback indicating that the item has been identified. However, until the cart can determine the action taken with respect to the identified item and/or the quantity involved, the display may present data indicating that the cart is still processing the event. For example, the display may present, adjacent the item-identifying information, an icon (e.g., a spinning circle, etc.) indicating that the cart is still attempting to determine the outcome of the event involving the item. Upon determining the outcome, such as the item being placed into or removed from the cart, as well as the quantity of the item involved with the take or return, the cart may cause the display to present data indicating the action and the quantity. For example, the cart may update the virtual-cart data presented on the display.

In addition to the cameras positioned towards the user operating the cart for identifying the user, the smart cart may further include one or more second cameras positioned on the frame of the cart such that an optical axis of the second camera(s) is directed towards a location where second image data generated by the second camera(s) represents or captures items that are placed in the cart, and removed from the cart, by a user. The second image data may be analyzed by the software component(s) of the cart, and/or by remote server(s), using one or more image processing techniques, such as text recognition, object recognition, and/or any other technique. The software component(s) may thus identify or determine item identifiers for the items represented in the image data.

As described below, the cart may include a frame that defines a basket to receive the items. The frame may couple to one or more weight sensors (e.g., load cells, etc.) configured to generate weight data indicative of a current weight of the basket. In some instances, upon the cart identifying an item via the image data generated by the cameras directed substantially towards the basket, the cart may determine a weight change that occurs before and after identification of the item. For example, the cart may initially wait until the weight reported by the weight sensors stabilizes and may thereafter determine a change in weight between the current, stabilized weight and a previous weight of the basket prior to the item identification. The cart may then determine, from an item catalog, the weight of the identified item (and the weight of any other items identified in the time period between the last reported weight and the current weight) and may provide this information to an event-determination component. The event-determination component may also receive the weight-change data and information about the current contents of the user's virtual cart and may use this received data to determine an outcome of the event. After doing so, the cart may update a virtual shopping cart for the user's shopping session (e.g., add an item to a list of items to be purchased by the user, or remove an item from the list of items to be purchased). In this way, the cart may identify and track items that are retrieved from different locations within the facility and, after determining the outcomes of events associated with these items, may maintain a virtual shopping cart, or virtual list, of the items selected by the user to provide a more seamless and efficient checkout experience for the user.

In some examples, the cart may have a frame that defines a basket comprising a bottom having quadrilateral shape, one or more (e.g., four) sides protruding from the bottom to define an interior cavity, and a top having a perimeter that defines an opening to receive items placed in the interior cavity of the basket. One or more second cameras may be positioned on the basket of the cart to generate image data representing the items placed in the cart. In some examples, the cameras may be included in respective capture assemblies that include other components, such as light sources (e.g., light emitting diodes (LEDs)) to active and emit light on the items such that the items are illuminated in the image data to help improve processing of the image data to identify the items. In other instances, the cameras may reside adjacent the light sources.

Although the cameras may be positioned anywhere on the cart, in some examples, the basket of the cart may have cameras disposed proximate to each of the four corners of the perimeter of the top of the basket. In this way, the entire cart may be represented in the various field-of-views (FOVs) of the cameras, which also may not be obstructed as the basket of the cart fills up with items. The cameras may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, etc.) that generate sensor data to detect movement of an item in, or out, of the cart while the cameras and light sources are de-activated or in a low-power state. In this way, proximity sensors, which may consume less power than the cameras and/or light sources, may detect movement proximate the cart before the cameras and/or light sources are activated.

Thus, the cart described herein may include four cameras disposed at or proximate to the four corners of the perimeter of the basket of the cart. To detect items placed in the cart, or removed from the cart, the cameras may have respective optical axes (e.g., imaginary line along which light propagates through the camera) that are oriented towards an interior of the perimeter of the top of the cart (e.g., towards the middle or centroid of the perimeter of the cart). By orienting the cameras inward with respect to the perimeter of the top of the cart, only items that pass through (e.g., in or out) of the opening of the basket may be represented in image data of the cameras.

The cameras may additionally be oriented to face in a particular vertical direction. For instance, the optical axes of the cameras may, in some examples, be directed downward towards the bottom of the basket to identify when items are placed in the bottom of the basket or taken from the bottom of the basket. For example, some of the carts described herein may include an over-the-basket structural element that couples to a left side and a right side of frame, with a middle portion of this structural element including a camera having an FOV directed substantially downwards into the basket. In addition, this over-the-basket element further include one or more light sources (e.g., LEDs) directed downwards and, in some instances, one or more lighting elements that a user or associate of the facility may selectively turn on to indicate different states of the cart, such as a state in which a user is requesting assistance, a state in which an age of the user is to be verified prior to sale of an item placed into the cart, and/or the like.

However, because users of the carts may not need to remove items from the cart to be scanned before leaving the facility, it may be advantageous for users to place one or more bags, or other item carriers, in the cart before their shopping session. In this way, users may simply retrieve items from racks or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. In such examples, the bags/item carriers may at least partially occlude the FOVs of the cameras such that the items are difficult or impossible to identify using image data from the cameras. Further, in some instances, one or more bag clips may be positioned outside a left and right side of the frame, respectively, for securing one or more bags in the basket. For example, a first strap of a bag may extend over the top of the frame and may attach to a first bag clip on the outside of a left side of the frame, while another strap of the bag may extend outside the basket and attach to a second bag clip outside a right side of the frame. Thus, a user may place items into the bag and, upon completing the shopping session, may remove the straps from the respective bag clips to acquire the items. Again, the bag may reside in the basket in a way that does not occlude the FOVs of the cameras directed substantially towards the interior of the basket.

In some examples the optical axes of the cameras may be directed upward relative to the top of the basket of the cart. For example, the top of the basket of the cart may be disposed in a substantially horizontal plane. The optical axes of the cameras may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four example cameras may be directed towards an interior of the perimeter of the top of the basket (e.g., towards a middle or centroid of the perimeter of the basket), and upward relative to a horizontal plane in which the top of the basket is disposed. In this way, the FOVs for each of the cameras may at least partially overlap at a location above, and potentially central to, the perimeter of the top of the cart to define a "sweet spot" or "target zone" where items are detected and/or captures by all four of the cameras.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or biometric information that may be used recognition. Once a user has identified themselves to a smart cart, the user may begin a shopping session where the smart cart identifies and track items retrieved by the user and placed in the smart cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the top of the cart (e.g., within 6 inches, within 1 foot, within 2 feet, etc.). The sensor data may be analyzed to detect an item above the perimeter of the top of the cart and trigger the light sources to begin illuminating light and the cameras to begin generating image data. The image data generated by the second camera(s) may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the idem-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 4A:
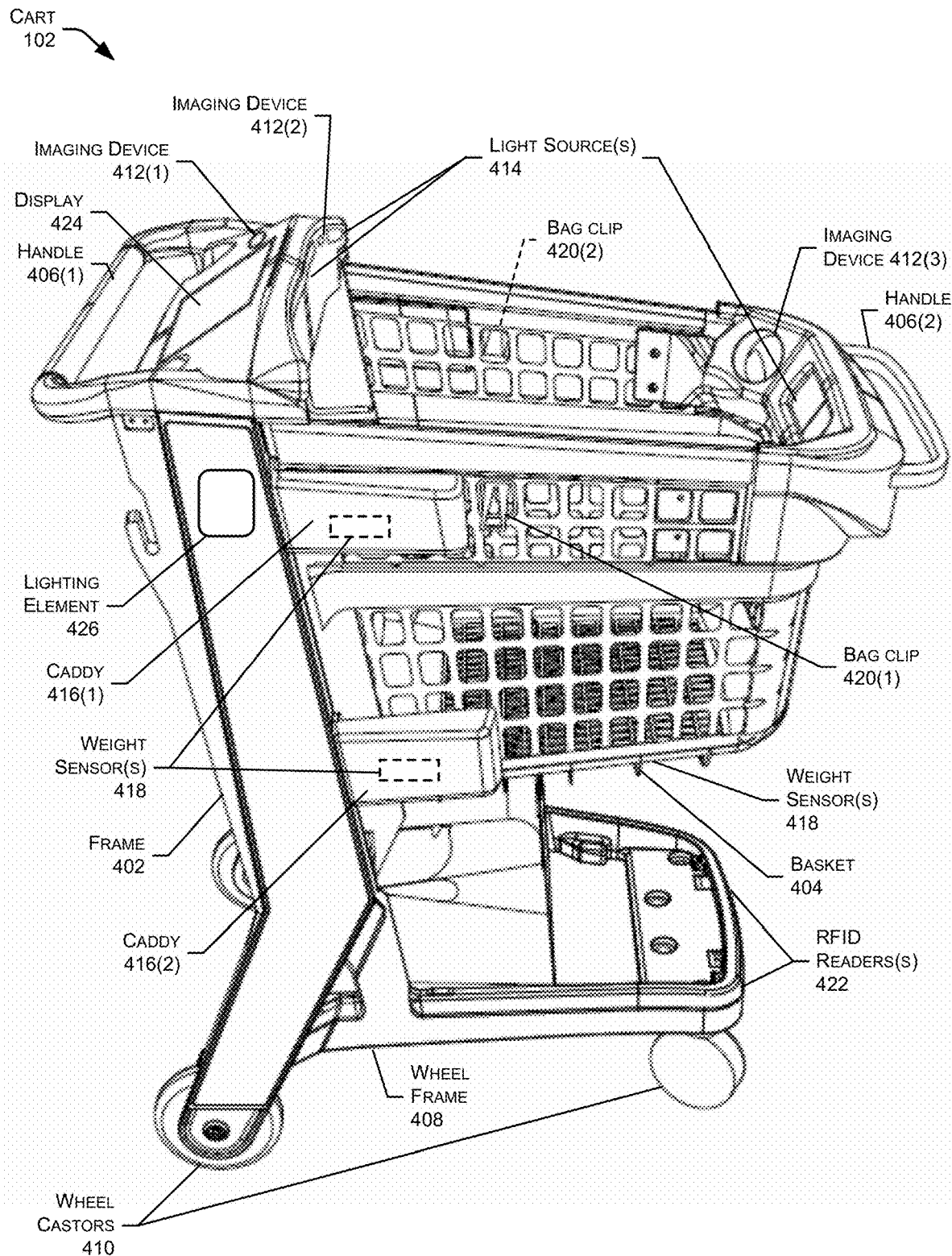
FIG. 4A illustrates a perspective view of an item-identifying cart that may be configured to identify items placed therein (e.g., using image data generated by one or more cameras mounted to the cart) and, thereafter, to determine the outcome of events involving the identified items. In addition, the cart may include one or more RFID readers configured to identify proximate RFID tags. The item-identification data and the tag data determined by the reader may be used, along with planogram data associated with the facility, for determining respective locations of RFID tags within the facility.
Figure 4C:
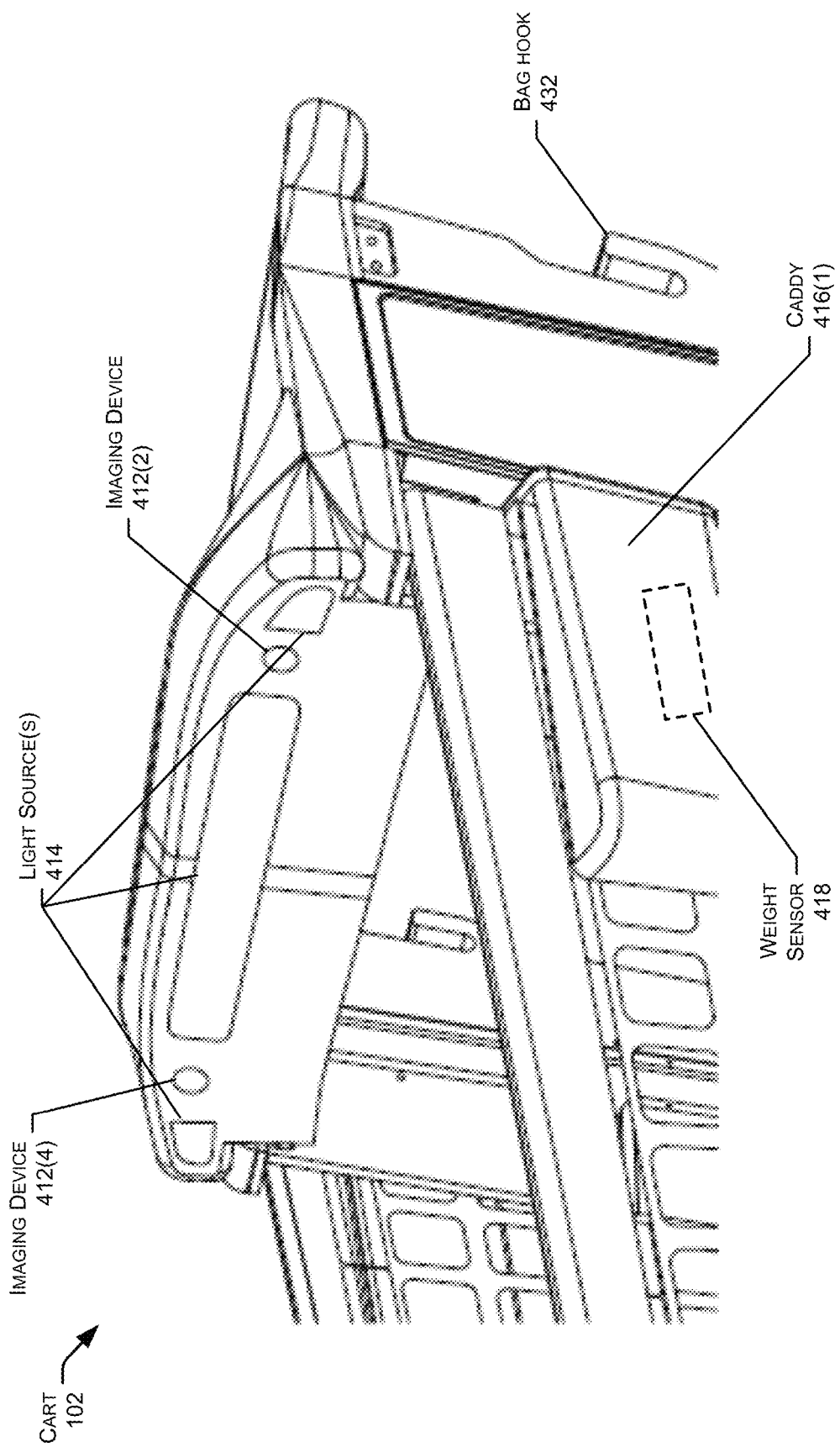
FIG. 4C illustrates yet another view of the example item-identifying cart of FIG. 4A. As illustrated, the cart may include one or more cameras for generating image data for identifying items placed into or removed from a basket of the cart. In addition, the cart may include one or more weight sensors for generating a current weight of the basket, which may be used to determine results of events involving the identified items.

FIG. 1 illustrates a facility 100 that includes a first cart 102(1) operated by a first example user 104(1) and a second cart 102(2) operated by a second example user 104(2). The carts (collectively 104) may comprise item-identifying carts configured with one or more sensors for identifying items placed into and removed from respective baskets of the carts 104. The carts may also be configured to determine the outcome of the events involving the items, such as a number of items involved in an event, an action (e.g., take or return) associated with the event, and/or the like. The carts may also each include one or more RFID readers, as described below. FIGS. 4A-C illustrate an example implementation of the carts 104.

In addition to the carts 104, the facility 100 may include, or may communicatively couple to, one or more servers 118 that store planogram data 120 and tag-location. In some instances, the servers 118 reside onsite at the facility 100, while in other instances the functionality of the servers 118 resides on the carts 104 and/or across the carts 104 and the onsite or remote servers. In either instance, the planogram data 120 stores data indicative of a planogram of the facility 100. That is, the planogram data indicates for each of multiple items in the facility, a respective item location associated with the item. These item locations may comprise X, Y coordinates, X, Y, Z coordinates, and/or any other type of location. For example, the planogram data may indicate that a first item (e.g. brand X soap) resides at coordinates $(X_{100}, Y_{100}, Z_{100})$ within the facility 100, while a second item (e.g., brand Y apple pie) resides at coordinates $(X_{104}, Y_{104}, Z_{104})$ within the facility 100. In some instances, the planogram data 120 is generally kept up-to-date, such that the respective item-to-item-location mappings representing in the planogram data 120 corresponds accurately with the real-world item locations on the racks 108.

The tag-location data 122, meanwhile, may represent for each of multiple tags in the facility 100, a respective tag location associated with the tag. In some instances, as described herein, the tags may be placed within the facility and, thereafter, the tag-location data 122 may be learned as users interact with items in the facility over time. Further, the planogram data 120 may be used in some instances to determine the tag-location data, as described below.

In the illustrated example, the first user 104(1) picks a first item 106(1) from a rack 108(1) within the facility and places this item 106(1) into the cart 102(1). As illustrated, the facility 100 includes racks 108(1), 108(2), and 108(3), defining respective aisles 110(1) and 110(2). In addition, the facility 100 includes RFID tags 114(1), (2), . . . , (8) affixed to different surfaces, such as to respective racks 108(1)-(3). As described in detail below, the RFID tags 114(1)-(8) may be used to determine the location of the carts 104 and/or other objects in the facility that include RFID readers mounted thereto. Further, each of the tags 114 may be associated with a respective location, although that location may be unknown upon initial deployment of the tags. For example, FIG. 1 illustrates that the first tag may be associated with a tag location 116(1), which may comprise X, Y coordinates, X, Y, Z coordinates, and/or any other type of location. In this example, the real-world tag location 116(1) may comprise example coordinates $(X_2, Y_2)$. In addition, the tag 114(8) may reside in a real-world tag location of $(X_4, Y_4)$ within the facility 100.

As illustrated, the user 104(1) takes the item 106(1) from an item location 112(1) of the rack 108(1). The item location may comprise X, Y coordinates, X, Y, Z coordinates, and/or any other type of location. In this example, the item 106(1) is associated with an item location ($X_1$, $Y_1$). That is, the planogram data 120 may store an indication that the item 106(1) is associated with the item location 112(1) of ($X_1$, $Y_1$).

FIG. 1 further illustrates, via the dotted arrows adjacent the cart 102(1), that one or more RFID readers may detect the presence of one or more RFID tags within the aisle 110(1). In this example, the RFID reader(s) of the cart 102(1) detect the presence of the tag 114(1), the tag 114(2), and the tag 114(3). In addition to detecting the presence of the respective tags, the RFID reader(s) may determine a signal strength associated with each of the tags at the current time illustrated in FIG. 1. In this example, the RFID reader(s) determine that a signal strength associated with the tag 114(1) is the largest signal strength of the three detected tags, meaning that the cart 102(1) is likely closest in space to this particular tag.

In some instances, in response to identifying the item 106(1), the cart 102(1) may provide an indication of the identified item 106(1) to the servers 118. In addition, the cart 102(1) may provide an indication of the tags detected proximate to the pick of the item 106(1), as well as the respective signal strengths associated with the detected tags. For example, in one instance the cart 102(1) may periodically or continually provide an indication of the tags being detected by RFID reader(s) of the cart 102(1), along with respective signal strengths. Upon receiving this information, the servers 118 may define a time range that is based at least in part on a time at which the cart 102(1) identified the item 106(1). In some instances, the time range may begin prior to the time at which the cart 102(1) identified the item and end after this time. For example, the time range may begin five seconds prior to the time of the item identification and end five seconds after.

After defining the time range, the servers 118 may analyze the tag data received from the cart 102(1) to determine the RFID tag that the cart 102(1) detected with the highest signal strength within the defined time range. In this example, the servers 118 may determine that the tag 114(1) is the tag with the highest signal strength. In response, the servers may associate a particular location with the tag 114(1) based at least in part on the item location 112(1) associated with the identified item 106(1). For example, in some instances the servers 118 may associate the item location 112(1) as the location of the tag 114(1). FIG. 1 illustrates, for example, that the server 118 have updated the tag-location data 122 to indicate that the tag 114(1) is associated with the location of ($X_1$, $Y_1$). That is, while the real-world location of the tag 114(1) may be slightly different (($X_2$, $Y_2$)), the servers 118 may use the item location 112(1) (($X_1$, $Y_1$)) as an approximation of the tag location 116(1).

In some instances, the process for determining tag locations may be repeated as users shop or otherwise interact with items in the facility over time. In these examples, each respective tag location may change, albeit slightly, as respective RFID readers provide different respective RFID-strength readings for the tags. In these instances, the strength of a particular RFID tag during an item scan may be used to determine a weight to associate with the tag location. For example, if the RFID signal strength associated with the closest tag (here, tag 114(1)) is relatively high, a relatively high weight may be associated with the location assigned to the tag (in this case, ($X_1$, $Y_1$)). If, however, the RFID signal strength associated with the closest tag were lower, the weight assigned to the location of the tag may also be lower.

Thus, the location of the tag 114(1) as determined over time may be more heavily influenced by events with users where users scanned items using their carts and the signal strength between the tag 114(1) and the respective carts is relatively high or strong and may be influenced less by events associated with a lower signal strength.

FIG. 1 further illustrates that the second user 104(2) picks a second item 106(2) from the rack 108(3) within the facility and places this item 106(2) into the cart 102(2). As illustrated, the item 106(2) is associated with a particular location of ($X_3$, $Y_3$), which may be stored in the planogram data 120. FIG. 1 further illustrates, via the dotted arrows adjacent the cart 102(2), that one or more RFID readers may detect the presence of one or more RFID tags within the aisle 110(2). In this example, the RFID reader(s) of the cart 102(2) detect the presence of the tag 114(6), the tag 114(7), and the tag 114(8). In addition to detecting the presence of the respective tags, the RFID reader(s) may determine a signal strength associated with each of the tags at the current time illustrated in FIG. 1. In this example, the RFID reader(s) determine that a signal strength associated with the tag 114(8) is the largest signal strength of the three detected tags, meaning that the cart 102(1) is likely closest in space to this particular tag.

In response to identifying the item 106(2), the cart 102(2) may provide an indication of the identified item 106(2) to the servers 118. In addition, the cart 102(2) may provide an indication of the tags detected proximate to the pick of the item 106(2), as well as the respective signal strengths associated with the detected tags. Upon receiving this information, the servers 118 may define a time range that is based at least in part on a time at which the cart 102(2) identified the item 106(2). After defining the time range, the servers 118 may analyze the tag data received from the cart 102(2) to determine the RFID tag that the cart 102(2) detected with the highest signal strength within the defined time range. In this example, the servers 118 may determine that the tag 114(8) is the tag with the highest signal strength. In response, the servers may associate a particular location with the tag 114(8) based at least in part on the item location 112(2) associated with the identified item 106(2). For example, in some instances the servers 118 may associate the item location 112(2) as the location of the tag 114(8). FIG. 1 illustrates, for example, that the server 118 have updated the tag-location data 122 to indicate that the tag 114(8) is associated with the location of ($X_3$, $Y_4$). That is, while the real-world location of the tag 114(8) may be slightly different (($X_4$, $Y_4$)), the servers 118 may use the item location 112(2) (($X_3$, $Y_3$)) as an approximation of the tag location 116(2).

While FIG. 1 illustrates updating the tag-location data 122 in response to the first and second users picking respective items, it is to be appreciated that the servers 118 (and/or carts 102) may continue to update the tag-location data 122 over time as users continue interact with items in the facility 100. In addition, the servers 118 may utilize statistical methods to determine when a tag-location has a sufficient accuracy so as to be deemed reliable. Furthermore, while FIG. 1 describes updating the tag-location data 122 using the planogram data alone, in other instances the servers 118 may update the tag-location data 122 using additional data, such as data indicating movement of the carts within the facility, known locations of other tags in the facility 100, and/or the like.

Furthermore, in addition to generating a map of tag locations of the RFID tags in the facility, the smart carts 102, the servers 118, and, potentially, sensors within the facility 100 may collectively provide a frictionless shopping experience to the users, such as the users 104(1) and 104(2). To utilize a cart 102, a user may approach an unused cart that is not currently engaged in a shopping session and interact with the unused cart 102 to identify themselves to the cart 102 and begin a shopping session. For instance, the carts 102 may include a first imaging device (e.g., an image sensor such as a camera, photodetector, or other sensing apparatus designed to read a one or two-dimensional barcode) such that when a user presents a user device, or portion thereof, such as the display, to the imaging device, the cart 102 may identify the user and corresponding user account for a shopping session. Other types of interaction may be performed by a user to identify themselves to a cart 102 (e.g., uttering a name or other keyword to identify the user, typing in a password or other user information into a display of the cart 102, and/or any other type of user identification technique).

Once a user has identified themselves to the cart 102, the item-identifying functionality of the cart 102 may be activated such that subsequent items 106 placed in the cart 102 will be identified by the cart 102 and added to a virtual shopping cart for the user. As illustrated, a user may move the cart 102 around the facility 100 to one or more item locations. The user may retrieve items from the item location and place the items 106 in the cart 102. Additionally, the user may retrieve items 106 from the cart 102 and put the items 106 back in an item location, such as when the user changes her mind regarding their desire to purchase or otherwise acquire the item. The cart 102 may include various components for identifying item identifiers corresponding to the items 106 placed in the cart and maintaining a virtual shopping cart for the shopping session of the user.

Once the user has finished their shopping session, the user may end the shopping session in various ways. For instance, the user may simply remove item bags or other item carriers from the cart 102 and leave the facility 100. After the user has ended their shopping session, the list of item identifiers in the virtual shopping cart may be uploaded to the servers 118, over one or more networks, that manage user accounts for users of the facility 100. The server(s) 118 may charge the appropriate user account for the listing of the items in the virtual shopping cart that the user took from the facility 100. For instance, the server(s) 118 may be configured to determine or generate information indicative of a cost of the items 106 picked by the user. Additionally, the server(s) 118 may store payment information (e.g., credit card information, bank account information, etc.) for each user account. In this way, when the user finished their shopping session and the cart 102 sends the listing of item identifiers in the virtual shopping cart over the network(s) to the server(s) 118, the server(s) 118 may be configured to determine a cost or price for all of the listed item identifiers, and charge the user via their payment information for the items 106 selected during their shopping session. In this way, the user need not go through steps of a traditional check-out experience (e.g., waiting in line for a cashier, scanning items with the cashier, paying for items at the cashier, etc.).

Figure 2:
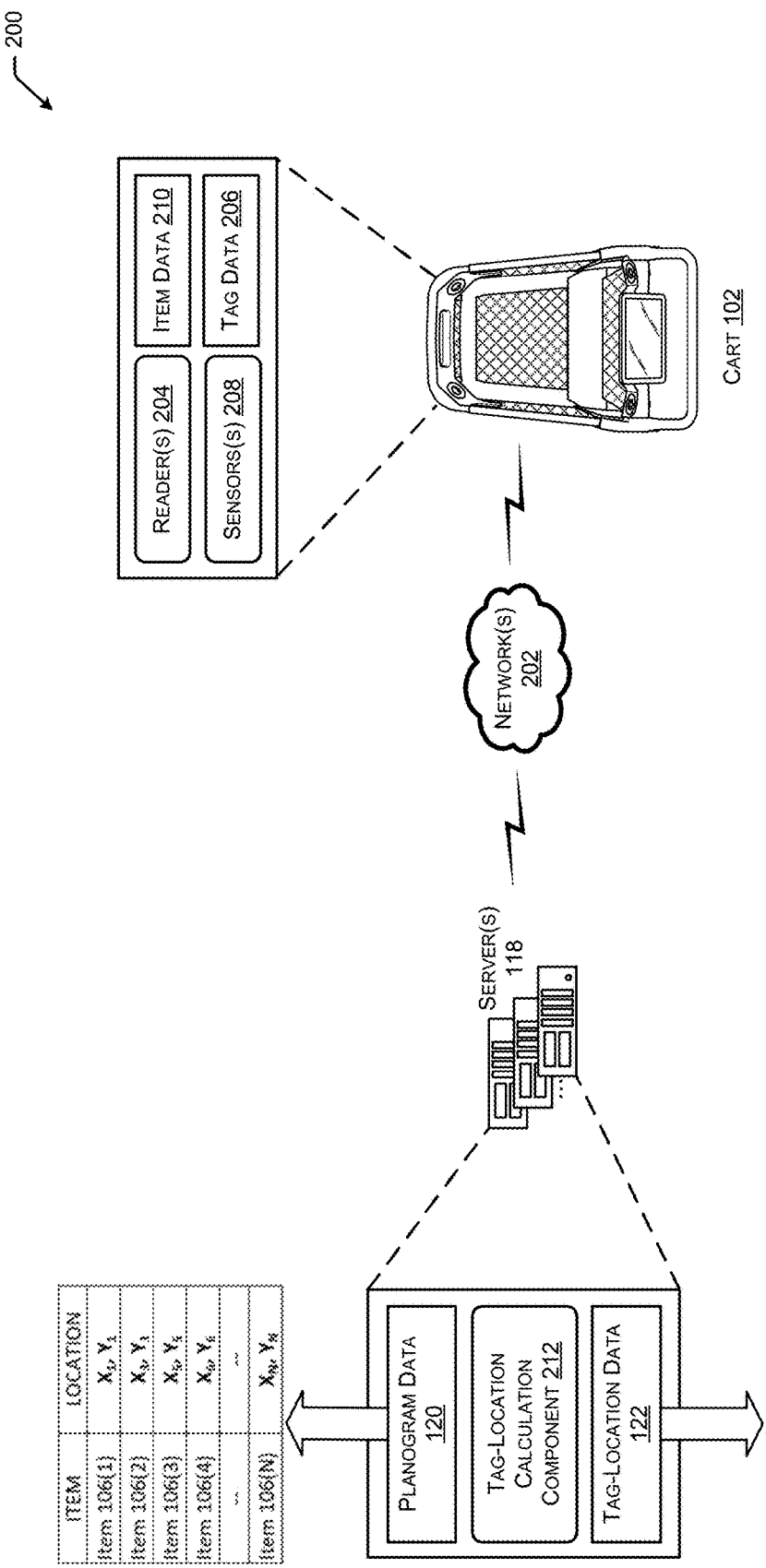
FIG. 2 illustrates example planogram data indicating respective item locations of different items in the facility and example tag-location data indicating respective tag locations of different tags in the facility. As introduced above, the tag-location data may be determined using the planogram data as users interact with items within the facility.

FIG. 2 illustrates additional details of the cart 102, as well as the servers 118. As illustrated, the cart 102 may communicate with the servers via one or more network(s) 202. The network(s) 202 described herein may include private networks such as an institutional or personal intranet, public networks such as the Internet, or a combination thereof. The network(s) 202 may utilize wired technologies (e.g., wires, fiber optic cable, and so forth), wireless technologies (e.g., radio frequency, infrared, acoustic, optical, and so forth), or other connection technologies. The network(s) 202 are representative of any type of communication network, including one or more of data networks or voice networks. The network(s) 202 may be implemented using wired infrastructure (e.g., copper cable, fiber optic cable, and so forth), a wireless infrastructure (e.g., cellular, microwave, satellite, etc.), or other connection technologies.

In addition, the cart 102 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) according to the type of protocol or standard being used. As noted above, in some examples, the servers 118 may perform some or all of the operations described below as being performed by the cart 102. While the servers 118 are illustrated as being in a location outside of the facility 100, in other implementations, at least a portion of the servers 118 may be located at the facility 100.

FIG. 2 further illustrates that the cart 102 may include one or more RFID readers 204 that are configured to detect RFID tags in a facility and measure respective signal strengths of these tags. As illustrated, the cart 102 may store tag data 206 indicative of the identifiers of the detected tags and the respective signal strength of these tags over time. As described above, in some instances the cart 102 may provide the tag data 206 to the servers 118 over the network 202. The RFID readers 204 may include one or more antennas configured to send an electromagnetic interrogation pulse that, when received, activates one or more RFID tags. In response to receiving this signal, the RFID tags may wirelessly transmit identifying information back to the RFID reader(s) 204. The tags may comprise passive tags and/or active tags. Further, and as discussed below with reference to FIG. 4A, in some instances the cart 102 includes at least two RFID reader(s) mounted near a bottom of a frame of the cart 102, such as a first reader directed leftwards from the cart and another directed rightwards.

In addition, the cart may include one or more sensors 208, which may include cameras, weight sensors, or the like for identifying items placed into or removed from the cart 102. As illustrated, these types of sensors may store item data 210, which may represent, at least in part, item-identification information, which may be sent to the servers 118 for determining an item location of any items placed into or removed from the cart (which, in turn, may be used to determine tag locations). In addition, the sensors 206 may include accelerometers or other motion-based sensors configured to generate movement data of the cart 102, which may be used along with the planogram data 120 for determining a location of a detected RFID tag.

FIG. 2 also illustrates example planogram data 120 and example tag-location data 122 in greater detail. The planogram data 120, for instance, illustrates that each of items 106(1)-(N) in the facility may be associated with a respective location. While illustrated in two-dimensional coordinates, in other instances the planogram data 120 may store the item-location in three-dimensional coordinates. In these instances, the tag-location 122 may also be represented in three-dimensional coordinates, or may be flattened to two-dimensional coordinates, particularly in instances where a facility deploys RFID tags at a uniform height from the floor or ceiling (e.g., seven inches from the floor).

FIG. 2 further illustrates that the servers 118 may include a tag-location calculation component 212, which may be configured to determine the tag-location data 122 based, at least in part, on the planogram data 120. For example, the tag-location calculation component 212 may receive the item data 210 and the tag data 206 from the cart 102 and may use this information for determining a particular location of a tag. For example, the tag-location calculation component 212 may determine, from the item data 210 and using the planogram data 120, an item location associated with an identified item represented by the item data 210. In addition, the tag-location calculation component 212 may use the tag data to determine an RFID tag associated with a highest signal strength proximate to (e.g., within a threshold amount of time of) a time associated with the take or return of the item. In response to identifying this tag, the tag-location calculation component 212 may store the item location as the tag location, may input this information into a trained model, may modify the item location using movement data, and/or may determine the tag location in any other similar manner. In some instances, the tag-location calculation component 212 may perform some or all of the operations of the processes described below with reference to FIGS. 3, 7, 8, 9A-B, and 10.

Figure 3:
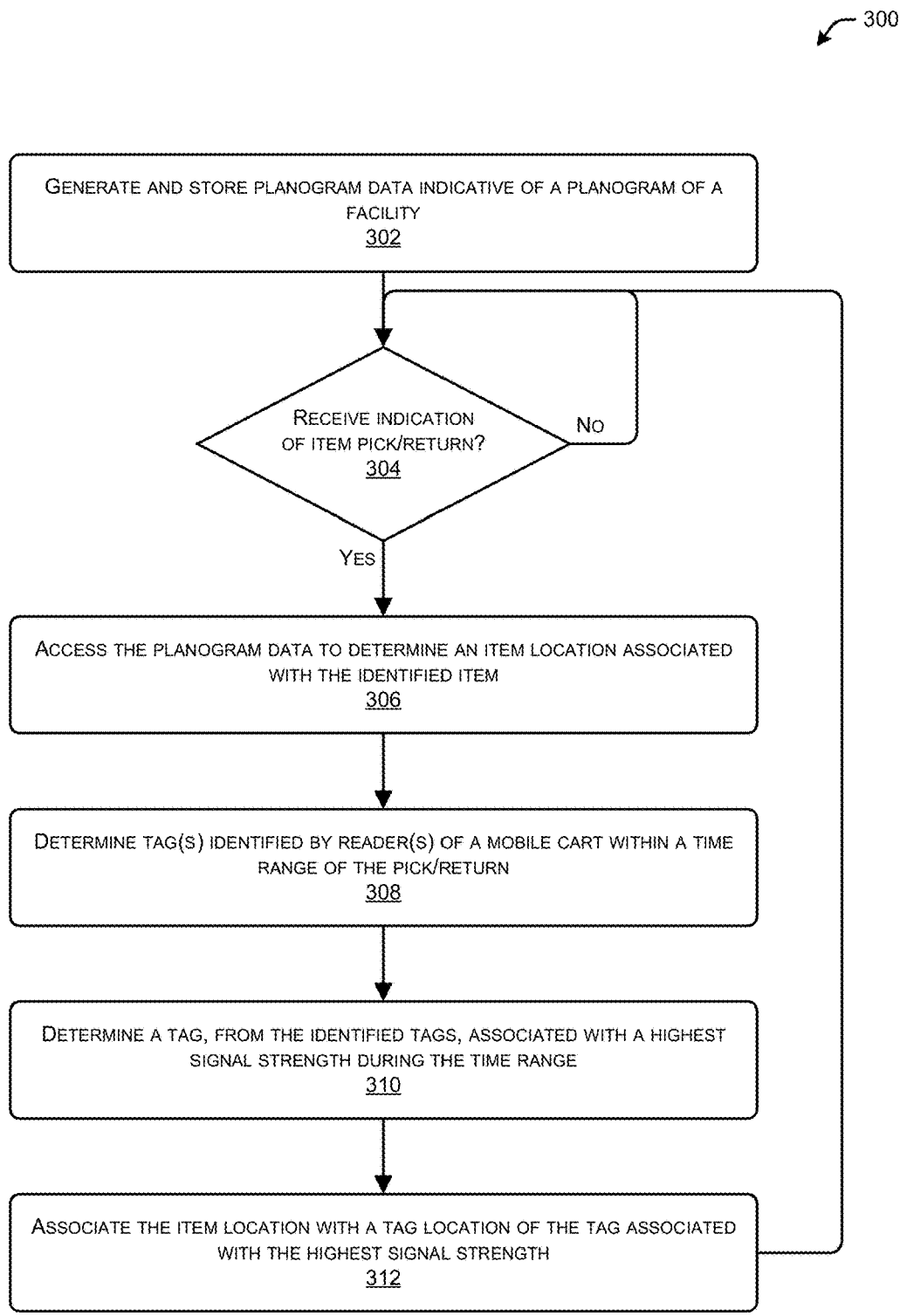
FIG. 3 illustrates a flow diagram of an example process for determining a location of a tag within a facility using item location data stored in a planogram.

FIG. 3 illustrates a flow diagram of an example process 300 for determining a location of a tag within a facility using item location data stored in a planogram. The process 300, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At an operation 302, the process 300 may generate and store planogram data indicative of a planogram of a facility. As described above, the planogram may represent a respective item location of each of multiple items offered in the facility. At an operation 304, the process 300 determines whether it has received an indication that a user operating a mobile cart in the facility has placed an instance of the specified item into a basket of the mobile cart. This may comprise the servers 118 of FIG. 1 receiving an indication from the cart 102 that the cart has identified an item being placed into or removed from the basket. If no indication is received, the process 300 may loop back to the operation 304.

Upon receiving such an indication, however, at an operation 306 the process 300 may access the planogram data to determine an item location associated with the item identified by the cart. This may include the servers 118 looking up the item location in the planogram data using the item identifier as a key.

At an operation 308, the process 300 determines one or more tags identified by one or more readers of the mobile cart within a time range of the pick or return of the item. For example, the servers 118 may define a time range around the time of the pick or return and may determine, from data received from the cart 102, the identity of any tags detected by the readers during this time range. At an operation 310, the process 300 determines a tag, from the tags identified at the operation 308, associated with a highest signal strength during this time range. Again, this operation may be performed based on tag data received from the cart and determined by the one or more readers.

At an operation 312, the process 300 may associate the item location with a tag location of the tag associated with the highest signal strength. That is, the servers 118 may store an indication that the location of the tag having the highest signal strength during the time range is the location of the identified item, determined from the planogram data. As described above, while the real-world location of the tag may differ from this item location, the item location may serve as a good approximation of the tag location.

FIG. 4A illustrates a perspective view of an item-identifying cart 102 that may be configured to identify items placed therein (e.g., using image data generated by one or more cameras mounted to the cart) and, thereafter, to determine the outcome of events involving the identified items (e.g., using one or more weight sensors mounted to a frame of the cart).

As illustrated, the cart 102 may generally include or be formed of a frame 402, a basket 404, a first handle 406(1) for pushing the cart 102, a second handle 406(2) for pulling the cart, a wheel frame 408, and one or more wheel castors 410 to enable movement of the cart 102 on a surface. The frame 402, the basket 404, the handles 406, and the wheel frame 408 may be formed from any suitable materials such as plastics, wood, metals, composites or any other combinations of materials. Moreover, frame 402, the basket 404, the handle 406, and the wheel frame 408 may take any form.

The basket 404 may generally be part of the frame 402 and/or supported by the frame 402 (e.g., be welded, fused, adhered, bolted, screwed, molded, or otherwise joined to the frame 402). In some examples, the basket 404 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 404 may generally be any shape that defines an interior cavity, or receptacle, for receiving items 106 that are placed in the cart 102. The basket 404 may comprise a bottom, multiple sides protruding from the bottom, and a top. As illustrated, the bottom basket 404 may be in the shape of a quadrilateral such that there are four sides protruding from the bottom of the basket 404. Similarly, the top of the basket 404 may be defined according to the quadrilateral shape and have a perimeter with four corners. The perimeter of the top of the basket 404 may define an opening to the interior cavity (or receptacle) of the basket 404 to receive items placed inside the basket 404. In various examples, the perimeter of the top of the basket may be disposed in a substantially horizontal plane (e.g., a plane substantially along the x-axis as illustrated), and the frame 402 may include at least one vertical member that extends downward from the basket 404 to the wheel frame 408 along a substantially vertical plane (e.g., a plane substantially along the y-axis as illustrated).

The wheel frame 408 may support one or more wheel castors 410 to enable movement of the cart 102 along a surface. The wheel castors 410 include one or more wheels, axles, forks, joints or other components which enable the cart 102 to travel on various surfaces. For example, in some implementations each of the wheel castors 410 may include a single wheel provided on an axle within a fork, or two or more wheels provided on such an axle. In some other implementations, the wheel castors 410 may include two or more axles. Alternatively, in still other implementations, a single caster may be provided in lieu of the multiple wheel castors 410. In accordance with the present disclosure, the wheel castors 410 may operate in any manner, such as being configured to pivot or swivel, and thus automatically adjust or align with a direction of travel. In some examples, the cart 102 may be equipped with other apparatuses for enabling the cart 102 to travel on solid surfaces, including one or more wheeled components other than casters, including but not limited to omnidirectional wheels, spherical wheels or other like apparatuses. Additionally, in some other implementations, the cart 102 may include two or more skis or other runners for traveling on smooth surfaces. In still other implementations, the cart 102 may be levitated, e.g., by magnetic levitation through the use of one or more linear induction motors. Moreover, the cart 102 may be propelled or pushed by humans or autonomous mobile robots or, alternatively, by one or more motors (e.g., electric-powered or gasoline-powered).

As illustrated, the cart 102 may include a first imaging device 412(1), for identifying a user operating the cart as described above, and additional, second imaging devices 412(2), 412(3), 412(4) . . . , 412(N) that include components for use in identifying items placed in the basket 404 and removed from the basket 404. The imaging device 412(1) may, in some instances, be positioned in a manner such that an FOV of the imaging device 412(1) is away from the basket 404 and substantially towards the first handle 406(1) where a user may typically operate the cart 102. The imaging devices 412(2)-(N) may be positioned at any location on the cart 102 (e.g., in the basket 404, on the basket 404, mounted to the frame 402, mounted to the basket 404, and/or any other location), oriented to have respective FOVs for identifying events that occur within and proximate to the basket 404. In some examples, the cart 102 may include at least four of the second imaging devices 412(1), 412(2), 412(3), and 412(N) that are disposed or coupled proximate to four corners of the top of the basket 404. In some examples, one or all of the components of the second imaging devices may be disposed internal to the form factor of the basket 404 and/or frame 402, at least partially internal to the form factor of the basket 404 and/or frame 402, and/or entirely external to the form factor of the basket 404 and/or frame 402 (e.g., mounted to the cart 102). However, in the illustrated example, the second imaging devices may be disposed at locations proximate to the four corners of the top or perimeter of the basket 404/frame 402. In some instances, the less that the second imaging devices protrude from the form factor of the cart 102, the more efficiently the carts 102 may be nested with respect to each other.

As described in further detail below with respect to FIG. 4B, the cart 102 may further include one or more one light sources (e.g., LEDs) for emitting light at or prior to the time of the second imaging devices generating the second image data. The cart 102 may further include, in some instances, one or more proximity sensors (e.g., ToF sensor, PIR sensor, etc.). In some examples the proximity sensors may be activated to detect the proximity of items 106 or other objects above the top of the basket 404. The proximity sensors may be configured to generate sensor data that indicates distances between objects above the top of the basket 404 of the cart 102 and the second imaging devices. The cart 102 may include components configured to analyze the sensor data and determine that an item 106 is within some threshold distance from the top of the basket 404 and/or within the basket 404. Upon detecting an object within the threshold proximity of the basket 404 using the proximity sensor, one or more components of the cart 102 may cause the light sources (LEDs) to emit light and the second imaging devices to generate image data. In some examples, the FOVs of the second imaging devices 412(2)-(N) may each at least partially overlap at a location above the top of the basket 404 corresponding to a centroid of the quadrilateral defining the top of the basket 404. The light sources may illuminate the basket 404 and/or the area above the top of the basket 404 to illuminate items 106 being placed in the cart 102, or removed from the cart 102, to act as a "flash" for the cameras that are generating image data. The second imaging devices may generate image data for a predefined period of time and/or until the proximity sensors (or the image data itself) indicates that there is no longer an object within the threshold distance from the cart 102 or top of the cart 102.

After generating the image data, one or more components of the cart 102 may process the image data to determine an item identifier for the item(s) 104 represented in the image data, and an event 106 for the image data (e.g., addition of an item 106 to the cart, removal of an item 106 from the cart). In some instances, the cart 102 may include component(s) to determine an item 106 identifier for the item 106 (e.g., name of the item 106, SKU number for the item 106, etc.), and determine if the item 106 is being taken from the cart 102, or added to the cart 102, based on the motion of the item 106 and the result of the movement around the cart 102 once movement is no longer detected and represented by the image data. In other instances, the image data may be analyzed to identify the item, while the weight data may be analyzed as described above and below for determining the event associated with the item.

In either of these instances, the components of the cart 102 may then update a virtual shopping cart associated with the cart 102 that indicates a virtual listing of items 106 taken by the user from the facility based on the determined event 106. In some examples, the image data may be transmitted to the server(s) 118 over the network(s) 202 where the processing may be performed.

In various examples, the cart 102 may include a display 424 to present various information in user interface(s) for the user to consume. In some examples, the display 424 may comprise a touch screen to receive input from the user (e.g., a selection of an item identifier to disambiguate amongst potential item identifiers). In some instances, the display 424 may present customized information to the user upon identifying the user, such as a shopping list of the user or the like. Further, the display 424 may be used to provide feedback to the user when one or more items have been identified and to update a virtual shopping cart of the user when one or more event(s) associated with these items have been determined. The display may also be used to indicate when components of the cart 102 are unable to identify an item or resolve an event associated with an item. In these instances, the display may present a request that a user perform some action, such as input on the display a result of the event, hold the item(s) in front of the imaging devices 412, or the like.

The cart 102 may further include a battery pack module that houses one or more batteries to power the components of the cart 102. The battery pack module may include rechargeable batteries. In some examples, the battery pack module may be detachably coupled to the wheel frame 408 and/or the frame 402 of the cart 102 such that the battery pack module may be removed and taken to a charging station. In various examples, the battery pack module may include rechargeable batteries that may be charged when the cart 102 is placed in a cart corral 208 (e.g., through electrical contacts, power cords, etc.). In various examples, the frame 402 and/or basket 404 may have one or more channels (e.g., grooves, holes, paths, tunnels, etc.) through which power cables/cords may pass. In this way, power cables may be run at least partially through the channels in the frame 402 and/or basket 404 inconspicuously to provide power to the various components of the cart 102.

In some instances, the cart 102 may further include one or more lighting elements 426 disposed on the frame 402 and/or basket 404 of the cart 102. The user may, in some instances, operate a controller to turn on (and off) the lighting element(s) 426 to cause the lighting element(s) to emit light. Further, in some instances the controller may enable the lighting element(s) 426 to transition between multiple light states, such as different colors, flashing effects, and/or the like. The controller operable by the user may comprise functionality accessible to the user via the display (e.g., one or more soft buttons for turning on and/or off the light), a physical toggle switch on the frame 402 of the cart 102, and/or the light. Further, the lighting element(s) 426 may be used to signal a predefined state of the cart 102 and/or the user. For example, the user may turn on the lighting element(s) 426 to indicate that he or she requests assistance from an associate of the facility 100, or for any other reason. In some instances, in response to the user operating a controller to request assistance, the cart 102 may perform one or more actions in addition to turning on the lighting element(s) 426. For example, the display may present content responding to this request, such as an offer to connect the user with an associate of the store (e.g., in person, via I/O devices of the cart, etc.). For example, in response to requesting assistance, the cart 102 may facilitate an audio-only or an audio/video call between the user and an associate of the facility using one or more I/O devices on the cart, such as the display, one or more speakers, one or more microphones, one or more cameras pointed toward the user and/or the like.

In still other instances, associates of the facility may, remotely or otherwise, operate the lighting element(s) 426 to change states (e.g., turn on or off) and/or the cart 102 may include components to automatically change a state of the lighting element(s) 426. For example, upon the card identifying that an item of a predefined class of items has entered the basket, the cart 102 may cause the lighting element(s) 426 to change state (e.g., from an off state to an on state) to indicate that an additional checkout workflow may now be required. For example, if the user places an item into the basket 404 that requires the purchasing user to be of a certain age (e.g., alcohol) or to have a certain prescription (e.g., medicine), the cart 102 may illuminate the lighting element(s). In some instances, the cart 102 may include a lighting element on a right side of the frame, a lighting element on a left side of the frame, and/or one or more other lighting elements in other locations on the cart 102. In still other instances, the lighting element(s) 426 may be illuminated to provide feedback to the user operating the cart. For example, the lighting element may be instructed to illuminate green in response to the cart identifying an item and orange in response to the cart failing to identify an item or resolve an event associated with an identified item.

FIG. 4A further illustrates that the cart may include the first imaging device 412(1) for identifying a user, the one or more second imaging devices 412(2)-(N) for identifying items placed into or removed from the basket 404, the display 424 for presenting information to a user operating the cart 102, and the one or more lighting elements 426. In addition, the cart 102 may include one or more light sources 414 that function to emit light prior to and/or while the second imaging devices 412(2)-(N) generate the second image data for identifying items placed into and removed from the basket 404. In some instances, these light sources 414 emit constant light, while in other instances the light sources 414 emit light in a strobing manner. In either of these instances, the light may be visible and/or non-visible light.

In addition, the cart may include one or more caddies, such as a caddy 416(1) and a caddy 416(2), coupled to the left and/or right side of the frame or basket of the cart 102. For example, the cart 102 may include the first and second caddies 416(1) and 416(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 412(2)-(N) such that the user is able to place personal items (e.g., keys, wallet, phone, etc.) into the receptacle defined by the respective caddy without the imaging devices 412(2)-(N) generating image data corresponding to this addition. In other instances, the caddies may be within the FOV of one or more of the imaging devices.

In addition, one or more of the caddies may include one or more respective weight sensors 418 for determining a current weight of the basket 404 and, thus, items in the basket 404. For example, each caddy may comprise a respective weight sensor 418 comprising a strain gauge or other sensor that continuously or periodically may be used to determine a weight of the basket and/or whether a change in weight has occurred. As illustrated, the cart 102 may include two weight sensors 418 on each side of the basket 404. Each pair of weight sensors 418 may, in some instances, reside along the same vertical axis. That is, a top weight sensor on the right side of the basket 404 may reside above a bottom weight sensor on the right side. In some instances, meanwhile, the cart 102 may additionally include a weight sensor 418 at the bottom of the basket, or the cart 102 may comprise a single weight sensor 418 residing at the bottom of the basket (and, thus, might not include the weight-sensor pairs on the side of the basket).

This weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 4A further illustrates that the cart 102 may include one or more bag clips, such as a bag clip 420(1) on a right side of the basket 404 and a bag clip 420(2) on a left side of the basket 404. As illustrated, the bag clips 420 may reside on an outside, top portion of the basket such that a user may place a bag into the interior of the basket while securing a first strap of the bag to the first clip 420(1) and a second strap of the bag to the second clip 420(2). Thereafter, the user may place items into and/or remove items from the bag. At the end of the shopping session, the user may remove the bag containing the items from the basket (e.g., by removing the straps from the clips) and exit the facility.

FIG. 4A further illustrates that the cart 102 may include one or more RFID reader(s) 422, which may be used as described above for detecting the presence and signal strength of one or more RFID tags affixed to different surfaces within the facility 100. As illustrated, the cart 102 may include a first RFID reader on a right, bottom side of the fame 402 for detecting RFID tags on a right side of the cart 102 and an RFID reader on a left, bottom side of the frame 402 for detecting RFID tags on a left side of the cart 102. In other instances, however, the RFID reader(s) 422 may reside at other locations on the cart 102 and/or distributed at multiple locations on the cart 102. As described above, this tag data 206 generated by the RFID reader(s) 422 may be used for determining the locations of tags within the facility and, thereafter, for determining a location of the cart 102 within the facility 100.

FIG. 4B illustrates an example front view of the cart 102. As illustrated, the cart includes the first handle 406(1) for pushing the cart 102, the second handle 406(2) for pulling the cart 102, the imaging device 412(1) for generating data for identifying a user operating the cart, the second imaging devices 412(2)-(N), and the display 424 to present content to the user operating the cart. The front view also illustrates that the cart may include the light source(s) 414 between the imaging device 412(3) and 412(N). In some instances, the cart may further include a light source to the left of the imaging device 412(3) and/or a light source to the right of the imaging device 412(N).

In addition, the cart 102 may include one or more cup holders 430 (in this example, on the left and right sides of the display 424) for holding respective cups of the user. In addition, each cup holder may include one or more device notches 428, comprising recesses of the cup holder in which a user may secure a device, such as a mobile phone or the like. That is, the device notches 428 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 428 of the cup holder 430.

FIG. 4C illustrates a closer view of one or more imaging devices 412(2) and 412(4) having an FOV substantially towards the basket of the cart. This figure also illustrates that the cart 102 may include one or more light sources 414 between the imaging devices 412(2) and 412(4), to the left of the imaging device 412(3), and/or to the right of the imaging device 412(2). In addition, FIG. 4C illustrates an example caddy 416(1), which may define a receptacle for housing one or more items, as discussed above. Further, one or more weight sensors 418 may reside within or adjacent to the caddy 416(1) for generating weight data indicating a weight or change in weight of the basket. Finally, this figure illustrates that the frame 402 of the cart 102 may include one or more bag hooks 432, comprising hooks in which a user operating the cart 102 may secure one or more bags. In some instances, the cart 102 may include a bag hook on a rear-left side of the frame (e.g., near a user operating the cart) and/or a bag hook on a rear-right side of the frame.

Figure 5:
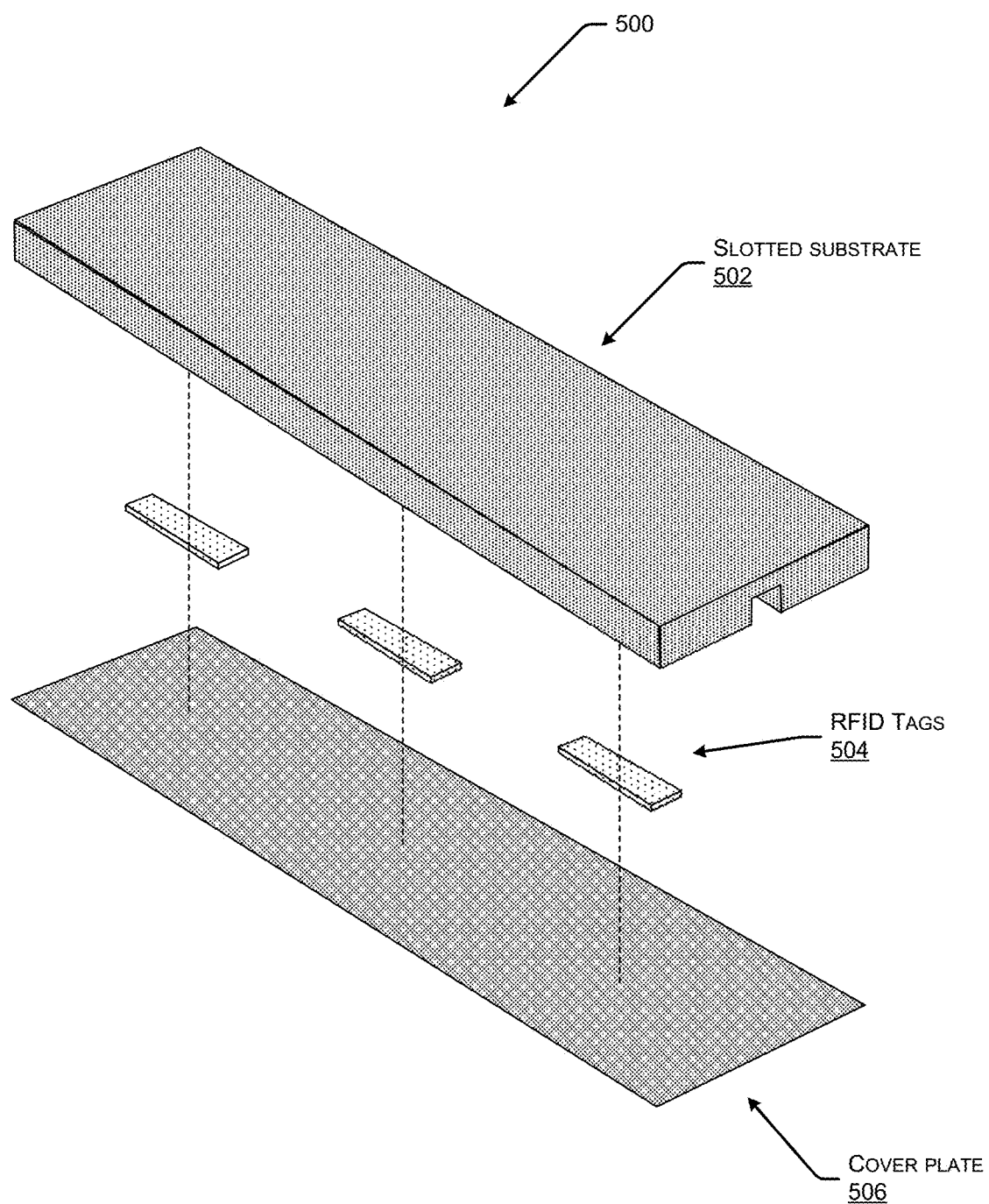
FIG. 5 illustrates an exploded perspective view of an example RFID-tag system that may be used within the facility of FIG. 1. As illustrated, one or more RFID tags may reside within a slotted substrate that is overlaid with a cover plate. This example system may enable the RFID readers of the item-identifying cart to identify the RFID tags from one side of the system, but not the other, which may be helpful in creating an accurate map of RFID locations within the facility.

FIG. 5 illustrates an exploded perspective view of an example RFID-tag system 500 that may be used within the facility 100 of FIG. 1. As illustrated, one or more RFID tags 504 may reside within a slotted substrate 502 that is overlaid with a cover plate 506. This example system 500 may enable the RFID readers 202 of the item-identifying cart 102 to identify the RFID tags 504 from one side of the system, but not the other, which may be helpful in creating an accurate map of RFID locations within the facility 100. In some instances, the cover plate 506 may be made or metal or the like, such that RFID readers that are on the cover-plate side of the RFID tags 504 are unable to effectively read the RFID tags 504. Meanwhile, the slotted substrate 502 may comprise wood, plastic, or any other material through which RFID readers may read the RFID tags 504.

For example, the system 500 may be mounted, in some instances, near a bottom portion of the illustrated racks 108 of FIG. 1, such as near a bottom portion near the floor on which the racks 108 sit. In some instances, the slotted substrate may comprise a material through which the interrogating signals of the readers 204 and the response signals from the tags 504 may travel, while the cover plate 506 comprise a material that interferes with these signals. In this manner, the system 500 may mounted such that the slotted-substrate side is directed towards a respective aisle 110(1), such that readers 204 of carts 102 travelling down the respective aisle are able to read the tags 504, while carts 102 traveling down other aisles are not. That is, because the cover-plate side of the system 500 is directed towards any carts 102 travelling in the other aisles, the RFID readers are unable to read these particular tags 504. Thus, the tag data 206 generated by the readers 204 of the respective carts 102 may generally correspond only to tags within the aisle of the cart, thus resulting in a more accurate tag-location map than if the map were generated using tags that we were readable from both sides of an aisle.

Figure 6:
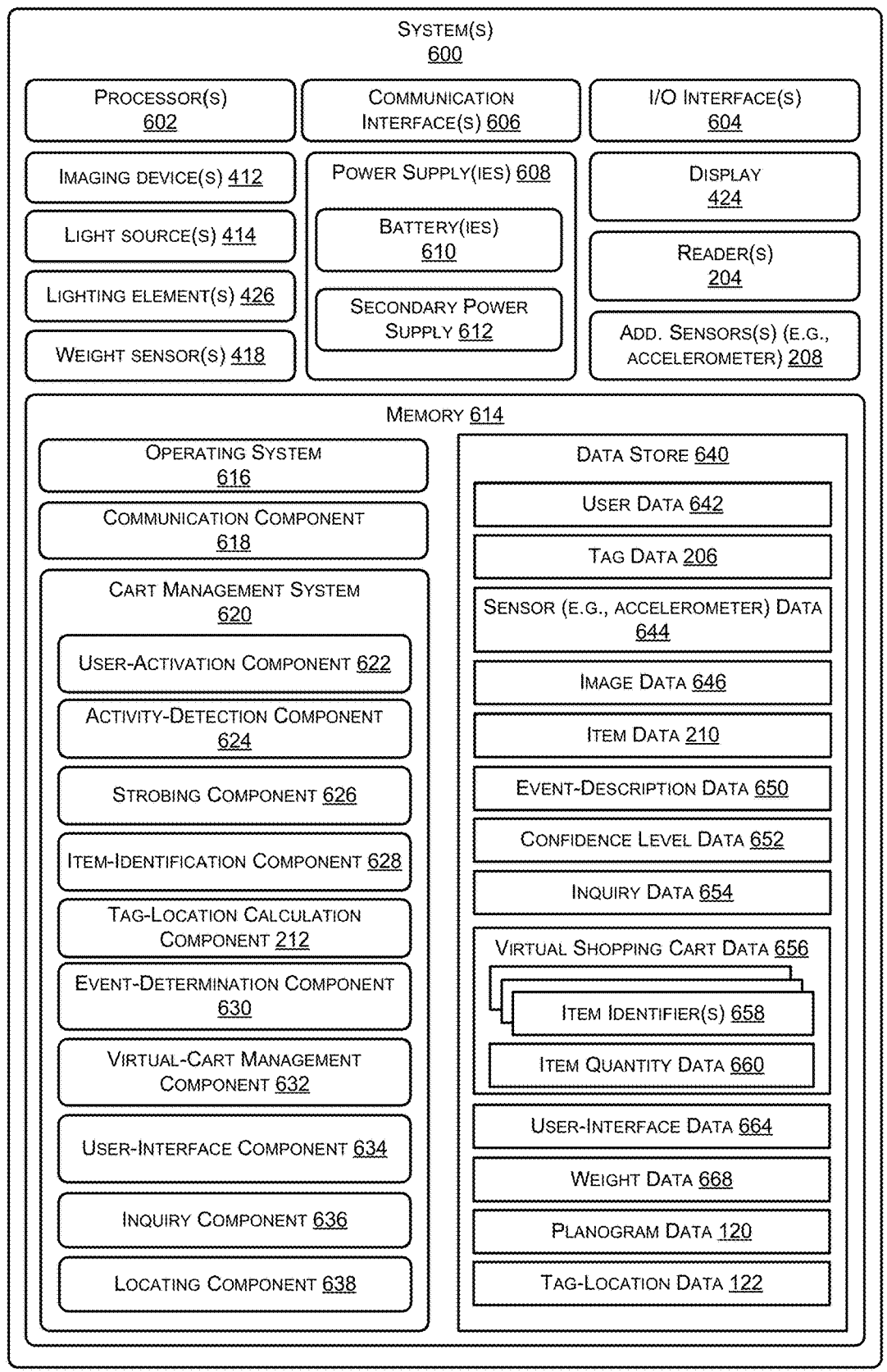
FIG. 6 illustrates example components of one or more systems for determining RFID tag locations using planogram data associated with a facility. The system(s) may represent an item-identifying cart, one or more backend servers, and/or a combination thereof.

FIG. 6 illustrates example components of one or more systems 600 for performing various functions described herein, including generating tag-location data 122. As the reader will appreciate the systems 600 may include components of the cart 102, components of the servers 118, or combinations thereof. Stated otherwise, it is to be appreciated that the illustrated "systems 600" may reside on a single or several adjacent devices, or across multiple different devices (e.g., some components on a cart and others on one or more remote servers).

The system(s) 600 may include one or more hardware processors 602 (processors) configured to execute one or more stored instructions. The processors 602 may comprise one or more cores. The system(s) 600 may include one or more input/output (I/O) interface(s) 604 to allow the processor 602 or other portions of system(s) 600 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth.

The system(s) 600 may also include one or more communication interfaces 606. The communication interfaces 606 are configured to provide communications between systems, such as between carts 102 and other devices, such as the server(s) 118, sensors, interface devices, routers, and so forth. The communication interfaces 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The system(s) 600 may also include one or more busses or other internal communications hardware or software that allow for the transfer of data between the various modules and components of the cart 102.

The system(s) 600 may also include the one or more imaging devices 412, such as the first imaging device 412(1) for identifying a user operating the cart and one or more second imaging devices 412(2)-(N) for identifying items placed into and removed from a basket of the cart. The cart 102 may further include the light sources 414, the lighting elements 426, and the weight sensors 418 described above. In some instances, the system(s) 600 further includes include one or more proximity sensors comprising any type of sensor that is able to detect the presence of nearby objects without the need for physical contact (e.g., ToF sensors, PIR sensors, etc.). The imaging devices, meanwhile, may comprise any type of camera or imaging device configured to generate image data (and/or video data) or information descriptive of a plurality of picture elements or pixels. Additionally, in some instances the system(s) 600 may include one or more imaging devices that are outward-facing and that generate image data representing the facility 100 around the cart 102.

The system(s) 600 may include one or more power supply(ies) 614 to provide power to the components of the cart 102. The power supply(ies) 614 may include one or more batteries 616 and a secondary (e.g., internal) power supply 618 to allow for hot swapping of battery packs, such as one or more capacitors, internal batteries, etc.

The system(s) 600 may also include a display 424 configured to display image data, such as pictures, videos, user interface elements, and/or any other image data. The display 424 may comprise any type of display 424 and may further be a touch screen to receive touch input from a user. The cart 102 may also include one or more microphones and one or more loudspeakers to facilitate a dialogue with a user, and/or to receive feedback from the user. The microphone(s) may capture sound representing the user's speech, and the loudspeaker(s) 622 may output machine-generated words to facilitate a dialogue, prompt a user for feedback on an item 106 and/or for other information, and/or output other alerts or notifications. The system(s) 600 may further include the readers 204 and one or more additional sensors, such as accelerometers, and the like. The readers 204 may generate the tag data 210 described above, which may indicate the identities and signal strengths of RFID tags identified by the readers 204 over time.

The system(s) 600 may include one or more memories 614. The memory 614 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 614 provides storage of computer-readable instructions, data structures, program modules, and other data for the operation of the system(s) 600. A few example functional modules are shown stored in the memory 614, although the same functionality may alternatively be implemented in hardware, firmware, or as a system on a chip (SOC).

The memory 614 may include at least one operating system (OS) component 616. The OS component 616 is configured to manage hardware resource devices such as the I/O interfaces 604, the communication interfaces 606, and provide various services to applications or components executing on the processors 602. The OS component 616 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 614. These components may be executed as foreground applications, background tasks, daemons, and so forth. A communication component 618 may be configured to establish communications with one or more of the sensors, carts 102, servers 118, or other devices. The communications may be authenticated, encrypted, and so forth.

The memory 614 may further store a cart management system 620. The cart management system 620 is configured to provide the item-identifying and event-determining functions (and other functions) provided by the cart 102 as described herein. For example, the cart management system 620 may be configured to identify a user operating a cart, identify items 106 placed into the cart, determine results of events involving these items, and maintain a corresponding virtual shopping cart for a user of the cart 102. While these components are described as operating on the cart 102, in some instances some or all of these components reside additionally or alternatively on the servers 118 or elsewhere.

The cart management system 620 may include a user-activation component 622 that performs operations for activating a shopping session using a cart 102 on behalf of a user. For instance, a user may have previously registered for a user account with an operator of the facility to utilize various automated management services provided by an operator of the facility 100. The user may have registered for a user account, such as by providing user data 642, to automate payments made for items taken by the user and included a payment means (e.g., credit card, bank account number, etc.), and may have also provided an identification means in the user data 642 to the user-activation component 622 such that the cart 102 can recognize the user. For instance, the user may have registered to identify themselves to the cart 102 using any identification technique by the user-activation component 622, such as by providing user data 642 by presenting an identification means to the first imaging device 412(1) (e.g., presenting a driver's license, presenting a facility-issued card, presenting a user identifier via a mobile phone, etc.), speaking a predefined utterance that is captured by the microphone(s) 620 (e.g., a name of the user, a predefined keyword, etc.), and/or providing other recognition information. Once a user has identified themselves to using the user-activation component 622, the user-activation component 622 may open a shopping session where the cart 102 identifies and track items 106 retrieved by the user and placed in the cart 102.

The cart management system 620 may additionally include an activity-detection component 624 configured to detect items 106 (or objects) within a particular proximity to the cart. For example, one or more proximity sensor(s) (if present) may generate sensor data 644 that indicates a distance between the proximity sensor(s) and any objects located in the FOV of the proximity sensor(s). The activity-detection component 624 may analyze the sensor data 644 and determine if an object is within a threshold distance indicating that the object is near the cart 102 and/or within or near the perimeter of the top of the basket 404 of the cart 102 (e.g., one foot from the proximity sensor(s), two feet from the proximity sensor(s), etc.). In this way, the proximity sensor(s) may generate sensor data 644 that indicates whether or not an item 106 is being moved in or out of the basket 404 of the cart 102. However, in some examples, rather than using sensor data 644 generated by a proximity sensor(s), the activity detection component 624 may utilize image data 646 generated by the imaging devices 412(2)-(N) to determine if an object is within a threshold distance from the cart 102. Further, and as described above, in some instances the event-determination component 630 may refrain from determining the result of an event until after the activity-detection component 624 determines that there any activity occurring within the basket 404 of the cart 102 has ceased.

The cart management system 620 may further include a strobing component 626 configured to cause the light sources 414 and/or shutters of the imaging devices 412 to strobe according to different frequencies. As noted above, the light sources 414 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 414 to emit light in the visible spectrum. When generating image data 646 using the imaging devices 412, motion blur may appear when capturing fact moving objects. However, the motion blur may be reduced or eliminated by exposing the imaging device's imager for a short (e.g., sub-millisecond) durations. Accordingly, the strobing component 626 may strobe the opening and closing of shutters of the imaging devices 412 to limit the sensor exposure duration. Additionally, the strobing component 626 may cause the LEDs to emit/strobe light at a particular frequency, as discussed further with respect to FIG. 10. In some instances, the strobing component 626 may cause the LEDs to strobe at a first rate (e.g., 1200 hertz) prior to detecting predefined activity, such as a user placing an item into or removing an item from a cart, while causing the LEDs to strobe at a second, different rate (e.g., 60 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 620 may also include an item-identification component 628 configured to analyze image data 646 to identify an item 106 represented in the image data 646. The image data 646 may comprise information descriptive of a plurality of picture elements, or pixels, for one or more image frames (e.g., a still picture, multiple picture frames, video frames, etc.). The item-identification component 628 may analyze the image data 646 using various image-processing techniques, or computer-vision techniques. For instance, the item-identification component 628 may extract a representation of an item 106 depicted in the image data 646 generated by at least one imaging device 412. The representation may include identifying text printed on the item 106, colors or color schemes printed in the item, determining 2-D and/or 3D shapes of the items 106, and/or other techniques for extract a representation of the item 106. In some instances, the representation of the item 106 depicted in the image data 646 may comprise a numeric representation, such as a feature vector or a set of feature vectors. In some instances, the item-identification component 628 identifies a barcode associated with a particular item.

The cart management system 620 may further include the tag-location calculation component 212, which may perform the techniques described herein for generating the tag-location data 122. As with other components described herein with regards to the system(s) 600, the tag-location component 212 may reside on the cart 102 and/or on the servers 118.

The cart management system 620 may further include a weight-change component 630 in some instances. The weight-change component 630 may be configured to receive raw weight data 668, in the form or respective signals, from the weight sensors, combine these signals into a single signal representing weight measurements over time, and perform the algorithms described above for determine a current weight estimation of the basket of the cart. The weight-change component 630 may also be configured to determine whether the current estimated weight represents a weight change that is greater than a threshold and, if so, may output a value of this weight-change data as part of weight data for determining the outcome of one or more events, as described above.

In some examples, a data store 640 stored in the memory 614 may include item data 210, which may include representations of the items 106 offered for acquisition at the facility 100. The item-identification component 628 may compare the extracted represented of the item 106 with the "gallery" or stored representations of the known items 106 in the item data 210. In some instance, the item representation may include an indication of a barcode or SKU data for the item 106 as recognized in, or extracted from, the image data 646. The item-identification component 628 may determine confidence level data 652 based on the comparisons with item representation in the item data 210. The item-identification component 628 may determine, and assign, confidence levels indicating how likely it is that the item 106 represented in the image data 646 corresponds to an item from the item gallery in the item data 210. Based on the confidence level data 652, the item-identification component 628 may determine an item identifier 658 for the item in the image data 646 (or multiple item identifiers 658) that corresponds to an item in the item data 210 to which the item 106 corresponds. Further, and as described above, feedback may be provided to the user in response to the item-identification component 628 determining an identifier of an item with a confidence level that is greater than a threshold confidence level. For example, the lighting element 426 may emit green light, the display 424 may present an image or other identifying information associated with the item, or the like.

In some examples, the data store 640 may include the planogram data 120 that may be used by the item-identification component 628 to determine the item 106, or that may be used to determine a location of an already identified item. The planogram data 120 may include or provide a mapping of physical locations within the physical layout of devices and objects such that the location of the cart 102 may be utilized to determine an item 106 stored nearby. The planogram data 120 may indicate the coordinates within the facility 100 of an inventory location 204, items 106 stored at that inventory location 204, and so forth. In examples where the cart 102 has location determining sensors (e.g., GPS, RFID, proximity, etc.), the location sensor data may be used to determine where in the store the user is. In such examples, the item-identification component 628 may access the planogram data 120 to determine if a location associated with the event is associated with items 106, and confidence levels for the corresponding representations of items in the item data 210.

The cart management system 620 may further include the event-determination component 630 to determine event-description data 660 for the item 106 in the image data 646. The event-determination component 630 may determine if the user is adding an item 106 to the cart 102, removing the item from the cart 102, and/or the like. The event-determination component 630 may also determine a quantity of items involved, as described above. For instance, the event-determination component 630 may receive an indication of any identified items since the last update of the virtual shopping cart, along with weight-change data from the weight sensors to determine the result of one or more events associated with the identified items, as described above.

The cart management system 620 may also include a virtual-cart management component 632 configured to manage virtual shopping cart data 656 for the cart 102. For instance, the virtual-cart management component 632 may utilize the item data 210, event-description data 660, and confidence level data 652 to add item identifier(s) 658 to the virtual shopping cart data 656 for items 106 that were added to the cart 102, remove item identifier(s) 658 from the virtual shopping cart data 656 for items 106 that were removed from the cart 102, and track item quantity data 660 indicating quantities of particular items 106 in the cart 102. In some instances, the virtual-cart management component 632 updates the virtual shopping cart data 656 in response to receiving information from the event-determination component 630.

The cart management system 620 may further include a user-interface component 634 configured to present user interfaces on the display 424 based on user-interface data 664. The user interfaces 664 may include one or more fields to present data, and/or receive touch input (or other input via a keyboard, mouse, etc.) from a user, and/or any of the feedback described above. For instance, if the item-identification component 628 is unable to determine an item identifier 658 for an item 106 shown in the image data 646, the user-interface component 634 may receive inquiry data 654 generated by an inquiry component 636 to prompt a user for feedback to help identify the item 106, and/or other information (e.g., if multiple items were placed in the cart 102). The inquiry component 636 may be configured to generate inquiry data 654 based on the information needed to identify the item 106. For instance, the inquiry data 654 may include a prompt to request particular feedback from the user, such as to provide input (e.g., touch input, vocal/utterance input, etc.) to identify the item 106, input to indicate how many items 106 were added to the cart, input to indicate whether an item 106 was removed or added, etc. In some examples, the user-interface component 634 may present one or more images depicting items from the item data 210 that have the highest confidence levels as corresponding to the item 106 in the image data 646, but confidence levels that are not high enough to make a final decision as to the item 106. For instance, the user-interface component 634 may present pictures of two different items that have high confidence levels 862 and request that the user select or indicate the appropriate item 106. Additionally, or alternatively, the user-interface component 634 may present user-interface data 664 that prompts the user for feedback regarding whether or not the item 106 was added to, or removed from, the cart 102.

In some examples, the cart management system 620 may further include a locating component 638 configured to determine locations of the cart 102 in the facility 100. For instance, the locating component 638 may analyze sensor data 644 collected by sensors of the cart 102 to determine a location. In some examples, the communication interface(s) 606 may include network interfaces that configured the cart 102 to receive or detect wireless signals (e.g., WiFi signals, Bluetooth signals, etc.) and generate sensor data 644 indicative of the signals. The locating component 638 may analyze the sensor data 644 using various techniques to identify the location of the cart 102, such as WiFi triangulation, received signal strength indicators (RSSI), and/or other methods for analyzing wireless signals to determine a location of the cart 102. In some instances, the facility 100 may include various infrared (IR) or near-IR emitters at different locations that emit light according to frequencies, patterns, etc. that indicate the different locations in the facility 100. In such examples, the cart 102 may include a light sensor to generate the sensor data 644 representing the IR or NIR and determine the location of the cart 102 in the facility. In some instances, there may be visible landmarks or markers throughout the facility that indicate a location in the facility, and the locating component 638 may analyze image data 646 generated by an outward facing camera to determine a location of the cart 102. As another example, there may be various radio frequency (RF) emitters positioned throughout the store, and the cart 102 may include an RF receiver to allow the locating component 638 to perform IR beaconing to determine the location of the cart 102. In many examples, the locating component 638 may use the tag data 210 generated by RFID readers 204 and may compare this tag data 210 to the tag-location data 122 to triangulate or otherwise determine the position of the cart 102. The locating component 638 may perform one, or any combination, of the above techniques to determine a location of the cart 102 in the facility and/or any other technique known in the art.

The locating component 638 may perform various operations based on determining the location of the cart 102 within the facility 100. For instance, the locating component 638 may cause user interface data 664 to be presented on the display 424 that includes a map of the facility 100 and/or directions to an item 106 for the user of the cart 102. Additionally, or alternatively, the locating component 638 may utilize the location of the cart, the planogram data 120, and/or item data 210 and "push" user interfaces to the display 424 that indicate various location-based information, such as indications of deals for items 106 located nearby, indications of items 106 located nearby and on the user's shopping list, and/or other user interface data 664.

Figure 7:
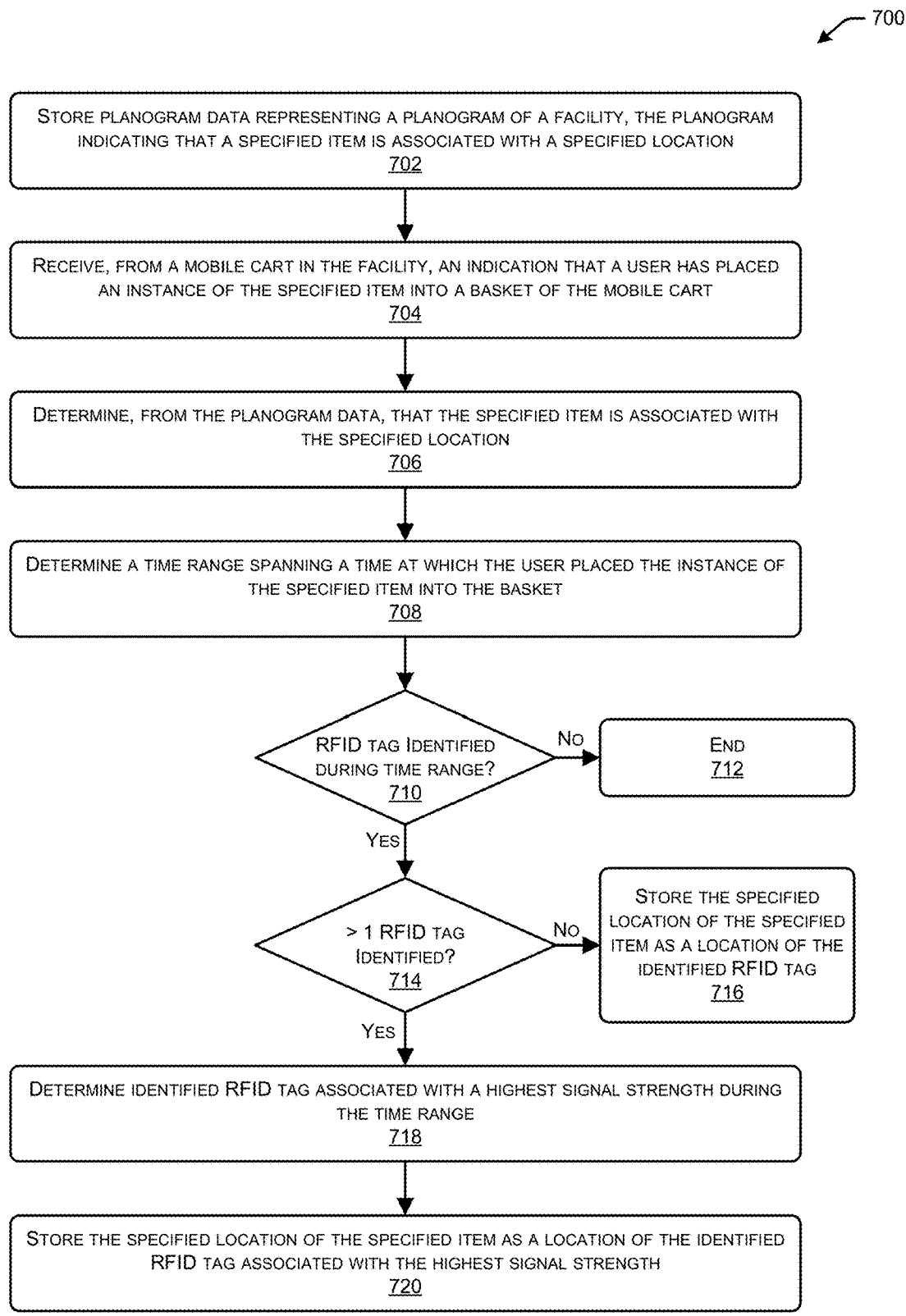
FIG. 7 illustrates a flow diagram of another example process for determining a location of a tag within a facility using item location data stored in a planogram. In this example, the process includes determining an item location of an item placed into or removed from a cart and associating this item location as a location of an RFID tag having a highest signal strength, as read by an RFID reader, proximate to the time that the item was placed into or removed from the cart.

FIG. 7 illustrates a flow diagram of another example process 700 for determining a location of a tag within a facility using item location data stored in a planogram. In this example, the process includes determining an item location of an item placed into or removed from a cart and associating this item location as a location of an RFID tag having a highest signal strength, as read by an RFID reader, proximate to the time that the item was placed into or removed from the cart. As with each process described herein, the process 700 may be performed by the cart 102, the servers 118, and/or a combination thereof.

At an operation 702, the process 700 stores planogram data representing a planogram of a facility, the planogram indicating that a specified item is associated with a specified location within the facility. For instance, the servers 118 may generate and store the planogram data 120 described above.

At an operation 704, the process 700 receives, from a mobile cart within the facility, an indication that a user operating the mobile cart has placed an instance of the specified item into a basket of the mobile cart. For example, the mobile cart may have determined, using image data of an item being placed in the cart, an identity of the item and may have provided item-identifying information to the servers 118.

At an operation 706, the process 700 determines, from the planogram data, that the specified item is associated with the specified location. For example, the servers 118 may access the planogram data using the item identifier as a key to determine an item location associated with the item.

At an operation 708, the process 700 determines whether an RFID tag has been identified by one or more RFID readers on the mobile cart during a time range defined at least partly by a time associated with the item being placed into the cart. For example, the cart 102 may periodically or continuously provide, to the servers 118 tag data indicating tags identified by the readers of the cart, potentially along with the respective signal strengths. Thus, the servers 118 may receive, one or more indication that an RFID reader coupled to the mobile cart has identified one or more RFID tags affixed to respective racks within the facility. If the servers 118 have received this information, the servers may determine whether any of these RFID tags were read within the defined time range. If not, then the process ends at an operation 710.

If, however, the servers 118 determine that an RFID tag has been read during this time range, then an operation 714 represents determining whether more than one RFID tag was identified during this time range. If not, then at an operation 716 the process 700 stores the specified location of the specified item as the location of the identified RFID tag. That is, the tag-location calculation component 212 may store the item location as the tag location within the tag-location data 122.

If, however, the process 700 determines that more than one RFID tag was identified during the time range, then at an operation 718 the process 700 determines the RFID tag of the identified tags that is associated with a highest signal strength during the time range. At an operation 720, meanwhile, the process 700 stores the specified location of the specified item as the location of the RFID tag having the highest signal strength. That is, the tag-location calculation component 212 may store the item location as the tag location within the tag-location data 122.

Figure 8:
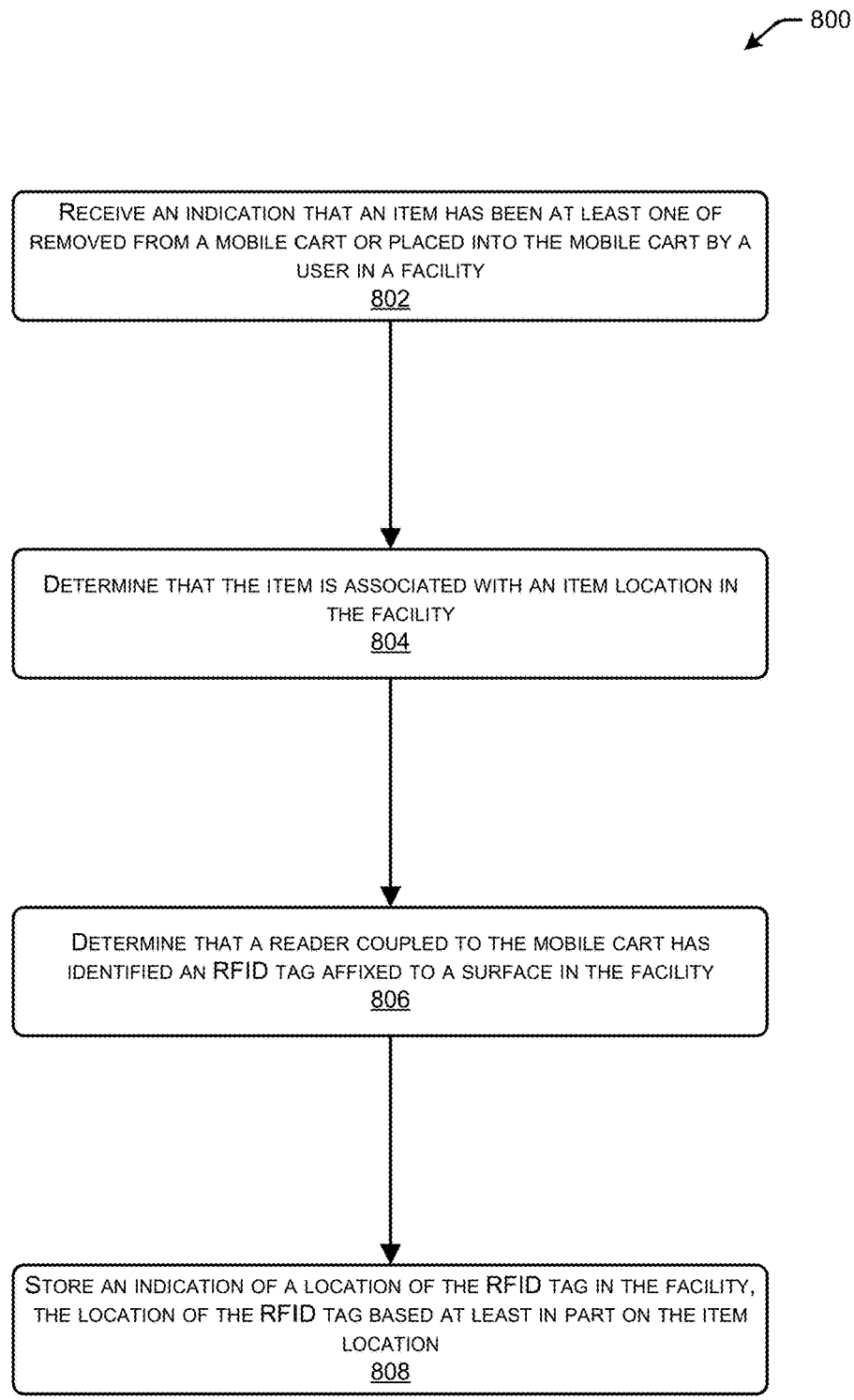
FIG. 8 illustrates a flow diagram of another example process for determining a location of a tag within a facility using item location data stored in a planogram.

FIG. 8 illustrates a flow diagram of another example process 800 for determining a location of a tag within a facility using item location data stored in a planogram. In some instances, the servers 118 (e.g., the tag-location calculation component 212) performs some or all of the operations of the process 800.

At an operation 802, the process 800 receives an indication that an item has been at least one of removed from a mobile cart or placed into the mobile cart by a user operating the mobile cart in a facility. As described above, this operation may occur in response to the cart identifying an item (e.g., using image data or weight data). At an operation 804, the process determines that the item is associated with an item location in the facility. For example, the process 800 may access planogram data to make this determination, as described above.

At an operation 806, the process 800 determines that a reader coupled to the mobile cart has identified a RFID tag affixed to a surface in the facility. Finally, at an operation 808, the process 800 stores an indication of a location of the RFID tag in the facility, the location of the RFID tag based at least in part on the item location associated with the item. In some instances, the location of the RFID tag is the item location, while in other instances this location of the RFID tag is based but may differ from the item location. For example, the RFID tag location may be based on the item location and additional information, such as movement data associated with the cart, known-tag-location data, and/or the like. Additionally, or alternatively, the RFID tag location may be determined by inputting data into a trained classifier as described below with reference to FIG. 10.

Figure 9A:
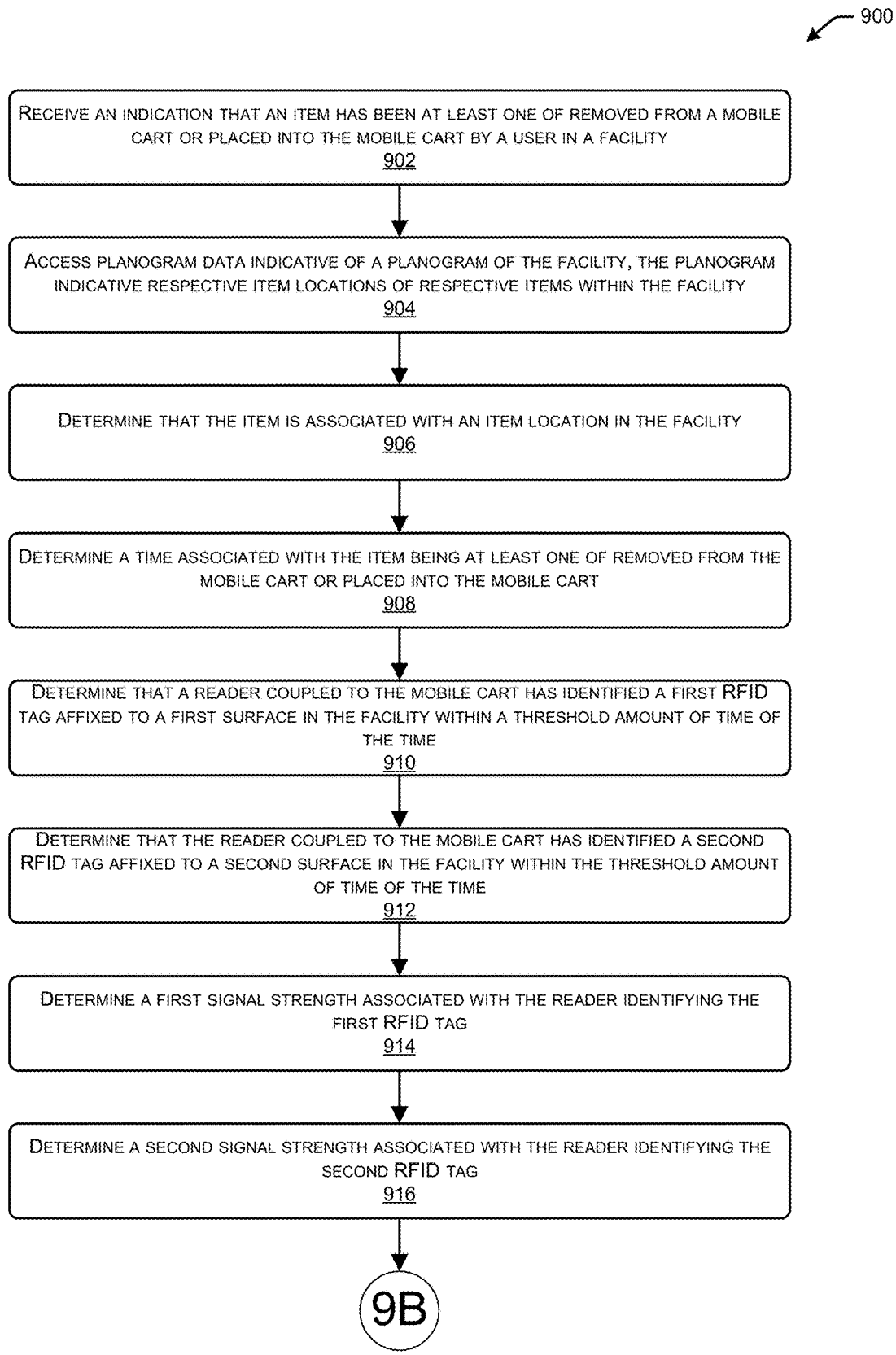
FIGS. 9A-B collectively illustrate a flow diagram of yet another example process for determining a location of a tag within a facility using item location data stored in a planogram. In this example, the location of the tag may be determined using an item location and, potentially, additional data such as accelerometer data generated by an accelerometer of the cart and/or known tag-location data indicating a known location of a different RFID tag in the facility.
Figure 9B:
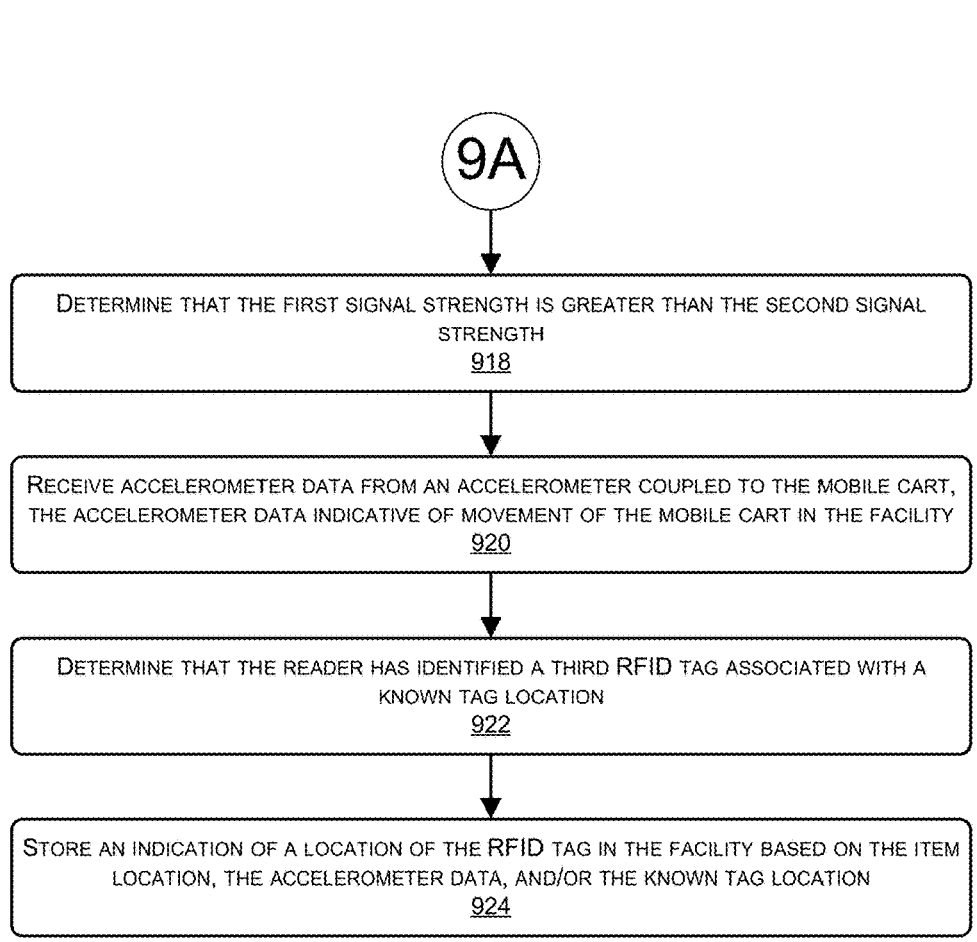

FIGS. 9A-B collectively illustrate a flow diagram of yet another example process 900 for determining a location of a tag within a facility using item location data stored in a planogram. In this example, the location of the tag may be determined using an item location and, potentially, additional data such as accelerometer data generated by an accelerometer of the cart and/or known tag-location data indicating a known location of a different RFID tag in the facility.

At an operation 902, the process 900 receives an indication that an item has been at least one of removed from a mobile cart or placed into the mobile cart by a user operating the mobile cart in a facility. As described above, this operation may occur in response to the cart identifying an item (e.g., using image data or weight data). At an operation 904, the process 900 accesses planogram data indicative of a planogram of the facility, the planogram indicative respective item locations of respective items within the facility. At an operation 906, the process 900 determines that the item is associated with an item location, which may be based at least in part on the accessing of the planogram data.

At an operation 908, the process 900 determines a time associated with the item being at least one of removed from the mobile cart or placed into the mobile cart and, at an operation 910, determines that a reader coupled to the mobile cart has identified a first RFID tag affixed to a first surface in the facility within a threshold amount of time of the time associated with the item being removed or placed into the cart. At an operation 912, the process 900 determines that the reader has also identified a second RFID tag affixed to a second surface in the facility within the threshold amount of time of the time associated with the item being removed or placed into the cart. At an operation 914, the process 900 determines a first signal strength associated with the reader identifying the first RFID tag and determines, at an operation 916, a second signal strength associated with the reader identifying the second RFID tag.

FIG. 9B continues the illustration of the process 900 and includes, at an operation 918, determining that the first signal strength is greater than the second signal strength. At an operation 920, the process 900 receives accelerometer data from an accelerometer coupled to the mobile cart, the accelerometer data indicative of movement of the mobile cart in the facility. In addition, at an operation 922, the process 900 determines that the reader has identified a third RFID tag affixed to a third surface within the facility, with this third RFID tag being associated with a known tag location.

At an operation 924, the process 900 stores an indication of the location of the first RFID tag (having the greater signal strength) based at least in part on the item location, the accelerometer, and/or the known tag location. For instance, the tag-location calculation component 212 may triangulate the location of the first RFID tag using the item location, the known tag location, and the movement indicated by the accelerometer data.

Figure 10:
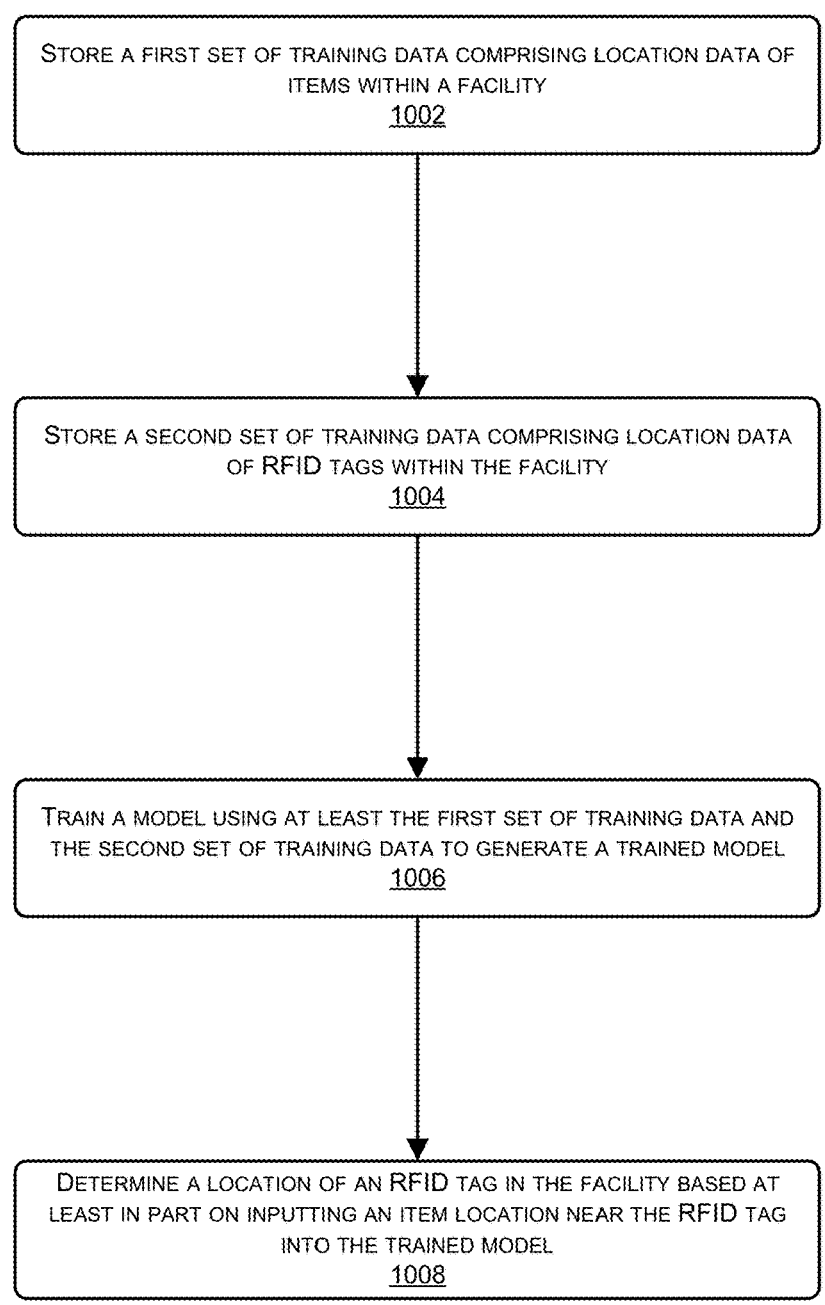
FIG. 10 illustrates a flow diagram of an example process for training a model using planogram data associated with a facility and known tag locations within the facility. Thereafter, the trained model may be used to determine previously unknown locations of RFID tags in the facility.

FIG. 10 illustrates a flow diagram of an example process 1000 for training a model using planogram data associated with a facility and known tag locations within the facility. Thereafter, the trained model may be used to determine previously unknown locations of RFID tags in the facility. In some instance, the tag-location calculation component 212 may perform some or all of the operations of the process 1000.

At an operation 1002, the process 1000 stores a first set of training data comprising location data of items within a facility. At an operation 1004, the process 1004 stores a second set of training data comprising location data of RFID tags within the facility. Thereafter, at an operation 1006 the process 1000 may train a model using at least the first set of training data and the second set of training data to generate a trained model. For example, a mobile cart that includes one or more RFID readers may be moved within the facility, and measurements of signal strengths of the different RFID tags may be obtained. This data, along with the first and second training data, may be used to train the model indicating the relationships between the location of the items, the locations of the tags, and the identity and signal strengths of the tags as different locations in the facility. After the model has been trained, at an operation 1008 the process 100 may use the trained model to determine the location of a particular RFID tag. For example, signal-strength data associated with one or more RFID tags may be input into the trained model, which may output an indication of the location of the particular tag.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 11:
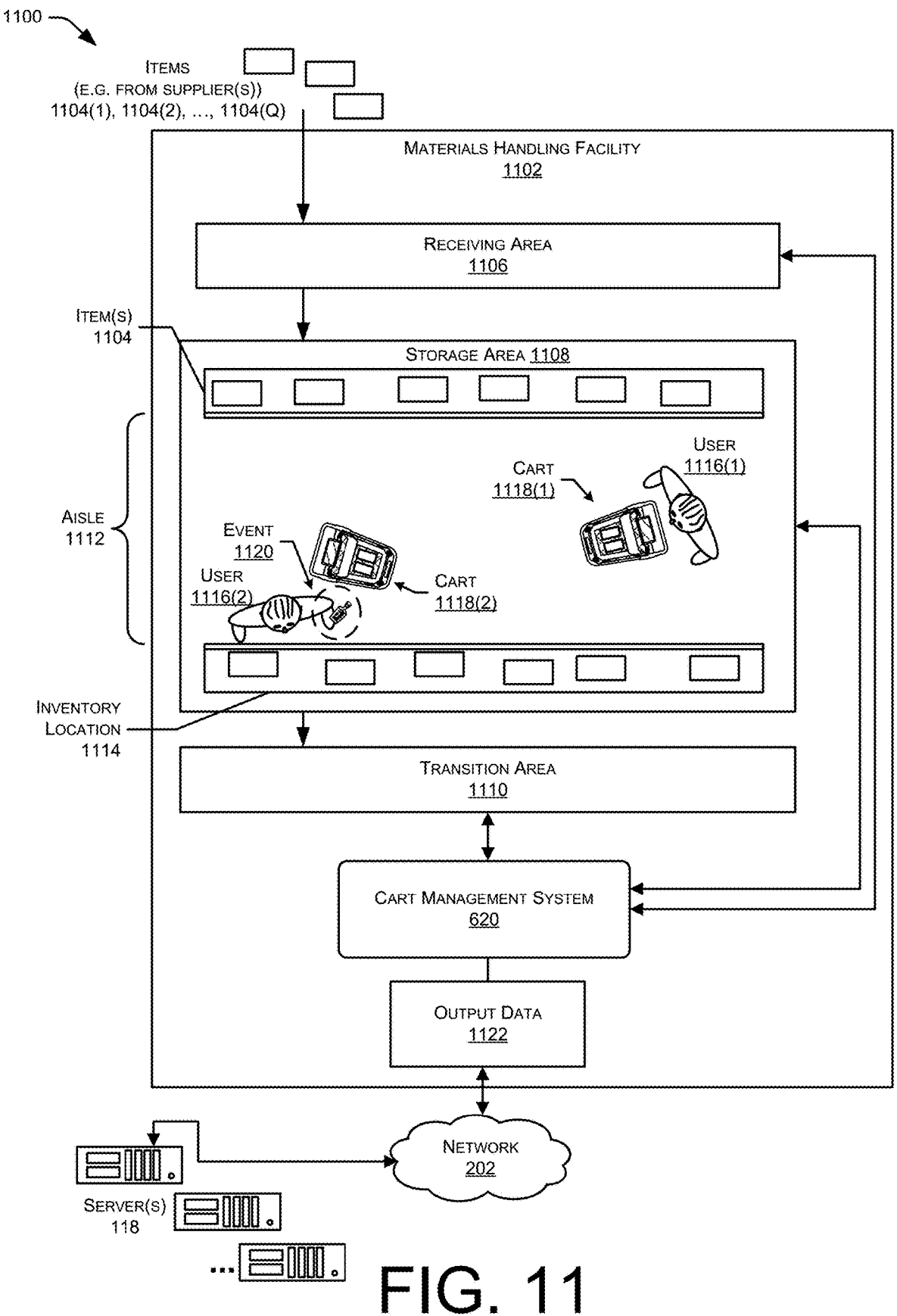
FIG. 11 is a block diagram of an example materials handling facility that includes item-identifying carts and a cart management system configured to generate output regarding events occurring in the cart using sensor data.

FIG. 11 is a block diagram 1100 of an example materials handling facility 1102 that includes item-identifying carts and a cart management system configured to generate output regarding events occurring in the cart using sensor data. However, the following description is merely one illustrative example of an industry and environment in which the techniques described herein may be utilized.

An implementation of a materials handling facility 1102 (e.g., facility 100) configured to store and manage inventory items is illustrated in FIG. 11. A materials handling facility 1102 (facility) comprises one or more physical structures or areas within which one or more items 1104(1), 1104(2), . . . , 1104(Q) (generally denoted as 1104) may be held. As used in this disclosure, letters in parenthesis such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one implementation, the storage area 1108 may include one or more aisles 1112. The aisles 1112 may be configured with, or defined by, inventory locations 1114 on one or both sides of the aisle 1112. The inventory locations 1114 may include one or more of racks, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2), . . . , 1116(U), carts 1118(1), 1118(2), . . . , 1118(T) (generally denoted as 1118) or other material handling apparatus may move within the facility 1102. For example, the users 1116 may move about within the facility 1102 to pick or place the items 1104 in various inventory locations 1114, placing them on the carts 1118 for ease of transport. An individual cart 1118 is configured to carry or otherwise transport one or more items 1104. For example, a cart 1118 may include a basket, a cart, a bag, and so forth. In other implementations, other agencies such as robots, forklifts, cranes, aerial drones, and so forth, may move about the facility 1102 picking, placing, or otherwise moving the items 1104.

One or more sensors may be configured to acquire information in the facility 1102. The sensors in the facility 1102 may include sensors fixed in the environment (e.g., ceiling-mounted cameras) or otherwise, such as sensors in the possession of users (e.g., mobile phones, tablets, etc.) or sensors mounted on the carts 1118. The sensors may include, but are not limited to, cameras, weight sensors (e.g., in the bottom of the carts 1118), radio frequency (RF) receivers, temperature sensors, humidity sensors, vibration sensors, and so forth. The sensors may be, in some examples, in or on the cart 1118 or another location in the facility 1102. In one example, the bottom of a basket of the carts 1118 may include weight sensors configured to determine a weight of the items 1104 placed thereupon.

During operation of the facility 1102, the sensors may be configured to provide information suitable for identifying the movement of items 1104 or other occurrences within the cart 1118. For example, a series of images acquired by a camera may indicate removal of an item 1104 from a particular cart 1118 by one of the users 1116 and/or placement of the item 1104 on or at least partially within one of the carts 1118.

While the storage area 1108 is depicted as having one or more aisles 1112, inventory locations 1114 storing the items 1104, sensors, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The carts 1118 may include, or be coupled to, a cart management system 620 (e.g., cart management system 620). The cart management system 620 is configured to identify interactions with and between users 1116 and carts 1118, in one or more of the receiving area 1106, the storage area 1108, or the transition area 1110. These interactions may include one or more events 1124. For example, events 1124 may include placing of an item 1104 in a cart 1118, returning of an item 1104 from the cart 1118 to an inventory location 1114, and so forth. Other events 1124 involving users 1116 may include the user 1116 providing authentication information in the facility 1102, using a computing device at the facility 1102 to authenticate identity to the cart management system 620, and so forth.

By determining the occurrence of one or more of the events 1124, the cart management system 620 may generate output data 1122. The output data 1122 comprises information about the event 1124 and, thus, in some instances may correspond to the event-description 660. For example, where the event 1124 comprises an item 1104 being removed from, or placed in, a cart 1118, the output data 1122 may comprise an item identifier indicative of the particular item 1104 that was removed from, or placed in, the cart 1118, a quantity of the item 1104, a user identifier of a user that removed the item 1104, and/or other output data 1122.

The cart management system 620 may use one or more automated systems to generate the output data 1122. For example, an artificial neural network, one or more classifiers, or other automated machine learning techniques may be used to process the sensor data and/or image data from the one or more sensors to generate output data 1122. The automated systems may operate using probabilistic or non-probabilistic techniques. For example, the automated systems may use a Bayesian network. In another example, the automated systems may use support vector machines to generate the output data 1122 or the tentative results. The automated systems may generate confidence level data that provides information indicative of the accuracy or confidence that the output data 1122 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominately spherical. Based on the difference in shape (cube vs. sphere) from the adjacent items, and the correspondence in shape with the previously stored image of the perfume bottle item 1104(1) (cubical and cubical), the confidence level that the user has picked up the perfume bottle item 1104(1) is high.

In some situations, the automated techniques may be unable to generate output data 1122 with a confidence level above a threshold result. For example, the automated techniques may be unable to distinguish which item 1104 in large a group of items a user 1116 has picked up from the inventory location 1114 and placed in the cart 1118. In other situations, it may be desirable to provide human confirmation of the event 1124 or of the accuracy of the output data 1122. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors. The subset of the sensor data may include images that may show the item 1104 being placed in, or removed from, the cart 1118. The subset of the sensor data may also omit images from other cameras that did not have that item 1104 in the field of view. The field of view may comprise a portion of the scene in the cart 1118 that the camera is able to generate sensor/image data about.

Continuing the example, the subset of the sensor data may comprise a video clip acquired by one or more cameras having a field of view that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. A general flow of items 1104 through the facility 1102 is indicated by the arrows of FIG. 11. Specifically, as illustrated in this example, items 1104 may be received from one or more suppliers, such as manufacturers, distributors, wholesalers, and so forth, at the receiving area 1106. In various implementations, the items 1104 may include merchandise, commodities, perishables, or any suitable type of item 1104, depending on the nature of the enterprise that operates the facility 1102. The receiving of the items 1104 may comprise one or more events 1124 for which the cart management system 620 may generate output data 1122.

Upon being received from a supplier at receiving area 1106, the items 1104 may be prepared for storage. For example, items 1104 may be unpacked or otherwise rearranged. An inventory management system of the facility 1102 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some implementations, like items 1104 may be stored or displayed together in the inventory locations 1114 such as in bins, on racks, hanging from pegboards, and so forth. In this implementation, all items 1104 of a given kind are stored in one inventory location 1114. In other implementations, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114.

When a customer order specifying one or more items 1104 is received, or as a user 1116 progresses through the facility 1102, the corresponding items 1104 may be selected or "picked" from the inventory locations 1114 containing those items 1104. In various implementations, item picking may range from manual to completely automated picking. For example, in one implementation, a user 1116 may have a list of items 1104 they desire and may progress through the facility 1102 picking items 1104 from inventory locations 1114 within the storage area 1108 and placing those items 1104 into a cart 1118. In other implementations, employees of the facility 1102 may pick items 1104 using written or electronic pick lists derived from customer orders. These picked items 1104 may be placed into the cart 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. Information about the transition may be maintained by the cart management system 620 using the output data 1122 associated with those events 1124.

In another example, if the items 1104 are departing the facility 1102 a list of the items 1104 may be used by the cart management system 620 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102.

The cart management system 620 may access or generate sensor data about the items 1104, the users 1116, the carts 1118, and so forth. The sensor data may be acquired by one or more of the sensors, data provided by other systems, and so forth. For example, the sensors may include cameras configured to acquire image data of items 1104 placed in the carts 1118. The image data may comprise still images, video, or a combination thereof. The image data may be processed by the cart management system 620 to determine an item identifier for the items 1104, a listing of items in the cart 1118 for a user 1116, and so forth. As used herein, the identity of the user of a cart 1118 may represent a unique identifier of the user (e.g., name, number associated with user, username, etc.), an identifier that distinguishes the user amongst other users being identified with the environment, or the like.

The cart management system 620, or systems coupled thereto, may be configured to identify the user 1116. In one implementation, this determination may comprise comparing sensor data with previously stored identity data. For example, the user 1116 may be identified by providing biometric information to a biometric-recognition system, by presenting a token carrying authentication credentials, providing a fingerprint, scanning a barcode or other type of unique identifier upon entering the facility, and so forth. Identity of the user 1116 may be determined before, during, or after entry to the facility 1102 and/or interaction with a cart 1118. Determination of the user's 816 identity may comprise comparing sensor data associated with the user 1116 in the facility 1102 and/or with the cart 1118 to previously stored user data. In some examples, the output data 1122 may be transmitted over a network 202 to server(s) 118.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed, cause the one or more processors to perform acts comprising:
storing planogram data representing a planogram of a facility, the planogram indicating that a specified item is associated with a specified location within the facility;
receiving, from a mobile cart within the facility, a first indication that a user operating the mobile cart has placed an instance of the specified item into a basket of the mobile cart at a first time;
determining, from the planogram data, that the specified item is associated with the specified location;
receiving, from the mobile cart, a second indication that a radio-frequency identification (RFID) reader coupled to the mobile cart has identified, at a second time, an RFID tag affixed to a rack within the facility;
determining that the second time is within a threshold amount of time of the first time; and
storing, at least partly in response to the determining that the second time is within the threshold amount of time of the first time, a third indication that the RFID tag affixed to the rack is located at the specified location associated with the specified item.

2. The system of claim 1, wherein:
the RFID tag comprises a first RFID tag; and
the one or more computer-readable media further store computer-executable instructions that, when executed, cause the one or more processors to perform acts comprising:
determining a time range occurring between a third time that is prior to the first time and a fourth time that is after the first time;
determining that the RFID reader identified the first RFID tag and a second RFID tag between the third time and the fourth time;
determining that the RFID reader identified the first RFID tag with a first signal strength;
determining that the RFID reader identified the second RFID tag with a second signal strength; and
determining that the first signal strength is greater than the second signal strength;
and wherein the storing the third indication comprises storing the third indication that the first RFID tag is located at the specified location at least partly in response to determining that the first signal strength is greater than the second signal strength.

3. A method comprising:
receiving a first indication that an item has been at least one of removed from a mobile cart or placed into the mobile cart at a first time by a user operating the mobile cart in a facility;
determining that the item is associated with an item location in the facility;
determining that a reader coupled to the mobile cart has identified, at a second time, a radio-frequency identification (RFID) tag affixed to a fixed surface in the facility;
determining that the second time is within a threshold amount of time of the first time; and
storing, at least partly in response to the determining that the second time is within the threshold amount of time of the first time, a second indication of a location of the RFID tag affixed to the fixed surface in the facility, wherein the location of the RFID tag affixed to the fixed surface in the facility is based at least in part on the item location associated with the item.

4. The method as recited in claim 3, further comprising accessing planogram data indicative of a planogram of the facility, the planogram indicative of respective item locations of respective items within the facility, and wherein the determining that the item is associated with the item location is based at least in part on the accessing of the planogram data.

5. The method as recited in claim 3, wherein the RFID tag comprises a first RFID tag affixed to a first fixed surface, and further comprising:
determining that the reader has identified a second RFID tag affixed to a second fixed surface within the facility within the threshold amount of time of the first time;
determining a first signal strength associated with the reader identifying the first RFID tag;
determining a second signal strength associated with the reader identifying the second RFID tag; and
determining that the first signal strength is greater than the second signal strength.

6. The method as recited in claim 3, wherein the storing the second indication of the location of the RFID tag affixed to the fixed surface in the facility in the facility comprises storing the indication of the location of the RFID tag affixed to the fixed surface in the facility as the item location.

7. The method as recited in claim 3, wherein the facility comprises a first facility, and further comprising:
storing a first set of training data comprising location data of items within the first facility or a second facility;
storing a second set of training data comprising location data of RFID tags within the first facility or the second facility;
training a model using at least the first set of training data and the second set of training data to generate a trained model; and
determining the location of the RFID tag in the facility based at least in part on inputting the item location associated with the item into the trained model.

8. The method as recited in claim 3, further comprising:
receiving accelerometer data from an accelerometer coupled to the mobile cart, the accelerometer data indicative of movement of the mobile cart in the facility; and
determining the location of the RFID tag in the facility based at least in part on: (i) the item location associated with the item, and (ii) the accelerometer data.

9. The method as recited in claim 3, wherein the RFID tag comprises a first RFID tag affixed to a first fixed surface in the facility, and further comprising:
determining that the reader coupled to the mobile cart has identified a second RFID tag affixed to a second fixed surface in the facility;
determining a known location of the second RFID tag in the facility; and
determining the location of the first RFID tag affixed to the first fixed surface in the facility based at least in part on: (i) the item location associated with the item, and (ii) the known location of the second RFID tag affixed to the second fixed surface in the facility.

10. The method as recited in claim 3, wherein the storing comprises storing the second indication of the location of the RFID tag affixed to the fixed surface in the facility in a data structure indicating respective locations of multiple RFID tags affixed to different surfaces in the facility.

11. A system comprising:
one or more processors; and
one or more computer-readable media storing computer-executable instructions that, when executed, cause the one or more processors to perform acts comprising:
receiving a first indication that an item has been at least one of removed from a mobile cart or placed into the mobile cart at a first time by a user operating the mobile cart in a facility;
determining that the item is associated with an item location in the facility;
determining that a reader coupled to the mobile cart has identified, at a second time, a radio-frequency identification (RFID) tag affixed to a fixed surface in the facility;
determining that the second time is within a threshold amount of time of the first time; and
storing, at least partly in response to the determining that the second time is within the threshold amount of time of the first time, a second indication of a location of the RFID tag affixed to the fixed surface in the facility, wherein the location of the RFID tag affixed to the fixed surface in the facility is based at least in part on the item location associated with the item.

12. The system as recited in claim 11, wherein the one or more computer-readable media further store computer-executable instructions that, when executed, cause the one or more processors to perform an act comprising accessing planogram data indicative of a planogram of the facility, the planogram indicative of respective item locations of respective items within the facility, and wherein the determining that the item is associated with the item location is based at least in part on the accessing of the planogram data.

13. The system as recited in claim 11, wherein the RFID tag comprises a first RFID tag affixed to a first surface, and the one or more computer-readable media further store computer-executable instructions that, when executed, cause the one or more processors to perform acts comprising:
determining that the reader has identified a second RFID tag affixed to a second fixed surface within the facility within the threshold amount of time of the first time;
determining a first signal strength associated with the reader identifying the first RFID tag;
determining a second signal strength associated with the reader identifying the second RFID tag; and
determining that the first signal strength is greater than the second signal strength.

14. The system as recited in claim 11, wherein the storing the second indication of the location of the RFID tag affixed to the fixed surface in the facility in the facility comprises storing the indication of the location of the RFID tag affixed to the fixed surface in the facility as the item location.

15. The system as recited in claim 11, wherein the facility comprises a first facility, and the one or more computer-readable media further store computer-executable instructions that, when executed, cause the one or more processors to perform acts comprising:
storing a first set of training data comprising location data of items within the first facility or a second facility;
storing a second set of training data comprising location data of RFID tags within the first facility or the second facility;
training a model using at least the first set of training data and the second set of training data to generate a trained model; and
determining the location of the RFID tag in the facility based at least in part on inputting the item location associated with the item into the trained model.

16. The system as recited in claim 11, wherein the one or more computer-readable media further store computer-executable instructions that, when executed, cause the one or more processors to perform acts comprising:
receiving accelerometer data from an accelerometer coupled to the mobile cart, the accelerometer data indicative of movement of the mobile cart in the facility; and
determining the location of the RFID tag in the facility based at least in part on: (i) the item location associated with the item, and (ii) the accelerometer data.

17. The system as recited in claim 11, wherein the RFID tag comprises a first RFID tag affixed to a first fixed surface in the facility, and the one or more computer-readable media further store computer-executable instructions that, when executed, cause the one or more processors to perform acts comprising:
determining that the reader coupled to the mobile cart has identified a second RFID tag affixed to a second fixed surface in the facility;
determining a known location of the second RFID tag in the facility; and
determining the location of the first RFID tag affixed to the first fixed surface in the facility based at least in part on: (i) the item location associated with the item, and (ii) the known location of the second RFID tag affixed to the second fixed surface in the facility.

18. The system as recited in claim 11, wherein the storing comprises storing the second indication of the location of the RFID tag affixed to the fixed surface in the facility in a data structure indicating respective locations of multiple RFID tags affixed to different surfaces in the facility.

* * * * *